United States Patent
Rubin et al.

(10) Patent No.: US 7,941,856 B2
(45) Date of Patent: May 10, 2011

(54) SYSTEMS AND METHODS FOR TESTING AND EVALUATING AN INTRUSION DETECTION SYSTEM

(75) Inventors: Shai A. Rubin, Madison, WI (US); Somesh Jha, Madison, WI (US); Barton P. Miller, Madison, WI (US)

(73) Assignee: Wisconsin Alumni Research Foundation, Madison, WI (US)

( * ) Notice: Subject to any disclaimer, the term of this patent is extended or adjusted under 35 U.S.C. 154(b) by 1229 days.

(21) Appl. No.: 11/294,585

(22) Filed: Dec. 5, 2005

(65) Prior Publication Data

US 2006/0253906 A1 Nov. 9, 2006

Related U.S. Application Data

(60) Provisional application No. 60/633,588, filed on Dec. 6, 2004.

(51) Int. Cl.
*G06F 11/00* (2006.01)
*G06F 12/14* (2006.01)
*G06F 12/16* (2006.01)
*G08B 23/00* (2006.01)

(52) U.S. Cl. .................................. 726/23; 713/188
(58) Field of Classification Search ............ 726/22–25
See application file for complete search history.

(56) References Cited

U.S. PATENT DOCUMENTS

| | | | |
|---|---|---|---|
| 5,765,030 A * | 6/1998 | Nachenberg et al. | 714/33 |
| 6,775,780 B1 * | 8/2004 | Muttik | 726/24 |
| 6,851,061 B1 * | 2/2005 | Holland et al. | 726/23 |
| 7,076,803 B2 * | 7/2006 | Bruton et al. | 726/23 |
| 7,093,239 B1 * | 8/2006 | van der Made | 717/135 |
| 7,325,252 B2 * | 1/2008 | Bunker et al. | 726/25 |
| 7,356,736 B2 * | 4/2008 | Natvig | 714/38 |
| 2003/0084319 A1 * | 5/2003 | Tarquini et al. | 713/200 |
| 2004/0107361 A1 * | 6/2004 | Redan et al. | 713/201 |
| 2008/0022401 A1 * | 1/2008 | Cameron et al. | 726/22 |
| 2010/0100963 A1 * | 4/2010 | Mahaffey | 726/25 |

* cited by examiner

*Primary Examiner* — Kambiz Zand
*Assistant Examiner* — Dant B Shaifer Harriman
(74) *Attorney, Agent, or Firm* — Boyle Fredrickson, S.C.

(57) ABSTRACT

Systems, methods and devices according to this invention include a plurality of defined modification rules for modifying a sequence of packets that form an attack on an intrusion detection system. These modification rules include both rules that expand the number of packets and rules that reduce the number of packets. The reducing rules can be applied to a given attack instance to identify one or more root attack instances. The expanding rules can then be applied to each root attack instance to generate a corpus of modified attack instances. The modification rules can preserve the semantics of the attack, so that any modified attack instance generated from the given attack instance remains a true attack. To test an intrusion detection system, the corpus of modified attack instances can be used to determine whether an intrusion detection system detects every modified attack instance.

6 Claims, 11 Drawing Sheets

Prior art

| RULE NAME | DESCRIPTION |
|---|---|
| Fragmentation ($T_1$) | Fragments an attack packet into two packets. Adds victim acknowledgement after each new packet. |
| Permutation ($T_2$) | Permutes packets in a TCP stream. To be sound, the permutation preserves the original order between attack packets and victim responses |
| Retransmission ($T_3$) | A family of rules that add a retransmitted attack packet to the original stream, such as retransmission of evasive RST packets (a packet retransmitted with the RST flag set.) |
| Header Change ($T_4$) | A family of rules that change the header of an attack packet. |
| Finger Padding ($T_5$) | Adds spaces before the username. |
| FTP Padding ($T_6$) | Adds benign FTP commands before a malicious command. For example, adding "CWD/tmp\n" and "LIST" but not "QUIT" (because it does not preserve semantics.) |
| HTTP Space Padding ($T_7$) | Insert spaces after an HTTP method: for example, changes an HTTP request from "get_<URL>" into "get___<URL>". |
| HTTP Multiple Requests ($T_8$) | Adds benign HTTP requests before a malicious request (e.g., "get ... CMD.EXE"). Such benign commands include "get .../INDEX.HTML", but without a "connection: close" option (because this changes the attack semantics.) |
| HTTP URL Encode ($T_9$) | Substitute printable characters in a URL with their equivalent ASCII values. |

FIG. 3

SYSTEMS AND METHODS FOR TESTING AND EVALUATING AN INTRUSION DETECTION SYSTEM

This application claims benefit of U.S. Provisional Patent Application Ser. No. 60/633,588, filed Dec. 6, 2004.

The subject matter of this application was made with U.S. Government support awarded by the following agencies: Navy/ONR N00014-01-1-0708. The United States has certain rights to this application.

BACKGROUND OF THE INVENTION

1. Field of the Invention

This invention is directed to systems and devices that detect attempts to gain unauthorized access to a network.

2. Related Art

Computer networks have become ubiquitous in offices, factories and even the home. Moreover, these networks are interconnected in various different ways. For example, local area networks associated with each site of a large commercial operation are often interconnected into wide-area networks. Home-based networks are often interconnected on an ad-hoc basis to employer or commercial networks using dial-up connections. Finally, almost every network, whether home-based, office-based or otherwise, is connected to the Internet, at least occasionally. In fact, many networks, including almost all commercial and office-based networks, and an increasing number of home-based networks, are connected to the Internet using "always on" connections such as cable, DSL, or satellite connections.

As computer networks have become ubiquitous, they have provided attractive targets for many malicious activities. All networks are vulnerable to attacks by intruders who attempt to gain unauthorized access to the network. Intruders can be internal to the network or outsiders who access the network using one of the above-outlined external connections.

All software systems contain bugs. The more complex a software system is, the more bugs it has and the more difficult it is to find such bugs. Accordingly, networks have holes in their operating software that allow unauthorized access and/or unauthorized use. A network that allows unauthorized access and/or use allows malicious users to steal data, such as personal data that allows for identity theft, corporate data such as trade secrets and other confidential information, and the like. Malicious, unauthorized access or use also permits malicious users to destroy data or otherwise disrupt commercial activities that use the intruded-on network, to use the intruded-on network as a base for redirected attacks against yet other networks in attempts to hide the malicious user's identity, and the like. Other types of unauthorized access or use, such as denial of service attacks and the like, can also be extremely disruptive to networks and their owners.

Intruders from outside of the network may attack a network's external presence, such as, for example, the network's web servers, e-mail servers and/or the like, or may attempt to obtain unauthorized access to machines within the network. As indicated above, such outside intruders can approach the network via the Internet, using dial-up lines, or may approach the network from a partner network that is linked to that network. For example, for a corporate network, such partner networks can include the network of a vendor, a customer, a reseller or the like.

Intruders also can be legitimate internal users of the network. Such internal intruders include users who misuse network privileges or who impersonate higher-privileged users. It is estimated that 80% or more of security breaches of a network are committed by inside intruders.

Thus, intrusions typically come in two flavors, intra-system intrusion and remote intrusion. Intra-system intrusion refers to intruders that already have some level of privilege to access the system. Intra-system intrusions attempt to gain additional administrative privileges for such intruders. In contrast, remote intrusion involves an intruder who attempts to penetrate a network remotely via some external connection to the network. Such remote intruders are usually completely unauthorized to access the network.

Accordingly, to prevent such unauthorized access or use, many networks employ firewalls and/or intrusion detection systems (IDS), including network intrusion detection systems (NIDS). In general, firewalls provide static protection, while intrusion detection systems provide protection that is more dynamic. Firewalls are simply devices that shut off all external access to a network, except for a few gateways that are specifically enabled. For example, a firewall, when first installed, typically stops all communication between the network and the external world. The firewall is then configured by carefully adding rules that allow specific types of traffic to go through the firewall. For example, a typical corporate firewall allowing access to the Internet will stop all UDP and ICMP traffic, stop incoming TCP connections but allow outgoing TCP connections. This stops all incoming connections from the Internet, such as from Internet hackers, but still allows internal users to connect in the outgoing direction.

Unfortunately, a firewall is simply a fence around the network having a couple of well-chosen gates. Such firewalls have no capability of detecting whether someone is attempting to break in or if those going through the gates are actually authorized to do so. Thus, firewalls are unable to stop intruders who are already authorized to pass through the gateways provided by the firewall, nor are they able to prevent intruders who are able to bypass or otherwise break through the firewall.

In contrast, intrusion detection systems (IDS), which include network intrusion detection systems (NIDS), can be used to determine whether a person requesting access to a network is doing so legitimately or is trying to gain unauthorized access to the network. Intrusion detection systems are also able to identify system intruders who originate from within the system. Because firewalls merely place a fence around the network, they do not look to activities inside the network that are properly classified as intrusions.

There are generally two different classes of intrusion detection systems: anomaly detection systems and signature recognition systems. Anomaly detection systems attempt to detect unauthorized intrusions based on identifying statistical anomalies. One advantage of anomaly detection-based intrusion detection systems is that the intrusion detection system can detect anomalies without having to understand the underlying cause behind the anomalous network activity. However, intrusions can escape detection if they do not create an anomaly. In contrast, misuse network intrusion detection systems, which are also called signature recognition-based intrusion detection systems, operate by examining the traffic traveling past a monitored point on the network for patterns that match defined attack signatures. For every different attack technique, a specific signature for that attack must be created for the intrusion detection system. One advantage of such signature recognition-based intrusion detection systems is that the attack does not need to create an anomaly. However, if the attack does not match any of the signatures provided to the signature recognition-based intrusion detection system, the attack will not be recognized and will be allowed to proceed.

SUMMARY OF THE DISCLOSURE

In fact, because many intruders, especially the most malicious intruders, assume that a network will be protected by an intrusion detection system, such malicious intruders assume that the intrusion detection system will be able to detect an open, well-known attack. Thus, to attempt to get the attack past the intrusion detection system, intruders generally attempt to hide the attack from the intrusion detection system. For signature recognition-based intrusion detection systems, hiding the attack generally means modifying the attack in a way that the attack still works but is no longer recognizable. This generally means that the attack no longer matches any of the signatures provided to the signature recognition-based intrusion detection system.

A number of simple techniques are well known for modifying an attack so that the attack does not match the signature of the unmodified attack. However, because the designers of such signature recognition-based intrusion detection systems are also aware of these techniques, the designers attempt to create a single signature that matches many attack invariants, and/or may create additional signatures designed to match, and thus catch, such modified attacks.

Unfortunately, determining whether the set of signatures provided to a signature recognition-based intrusion detection system for a given attack is sufficient to detect all possible usable modifications to that given attack is a non-trivial problem. When attempting to create such a sufficient set of signatures, developers of intrusion detection systems have a number of problems. First, there is no standard definition for an attack. That is, an attack can be defined as anything that exploits a particular vulnerability in a particular piece of software. Alternately, an attack can be defined as anything that violates a security policy of the administrator of the site, i.e., something that gains a user unauthorized access. In fact, attacks are often launched to obtain unauthorized access to a network. However, this defines an attack based on its result, rather than its internal structure.

Second, because there is no strict definition for an attack, signature recognition-based intrusion detection system designers have conventionally created the modified signatures on an ad-hoc basis based on their appreciation of the types of modifications that an intruder could make to an attack. If an intrusion detection system fails to detect even one modified attack, that intrusion detection system leaves the network extremely vulnerable. Thus, such an ad-hoc approach will be successful only if the designers are able to imagine every possible modification to every possible attack that could occur to a determined intruder.

The inventors of the subject matter of this application have determined that it would be advantageous to be able to systematically test a signature recognition-based intrusion detection system to ensure it is able to successfully identify attacks, regardless of the possible modifications a malicious intruder could make to such attacks.

This invention provides systems, methods and devices for systematically testing an intrusion detection system.

This invention separately provides systems, methods and devices for systematically testing a signature recognition-based intrusion detection system.

This invention separately provides systems, methods and devices for systematically testing a network intrusion detection system.

This invention separately provides systems, methods and devices for modifying a given attack to generate modified attacks.

This invention separately provides systems, methods and devices for generating modified attacks usable to test an intrusion detection system.

This invention separately provides systems, methods and devices for systematically modifying a given attack.

This invention separately provides systems, methods and devices for determining a root version of a given attack.

This invention further provides systems, methods and devices for modifying the root version of a given attack to generate modified versions of the root attack.

This invention separately provides systems, methods and devices for applying modification rules to systematically modify a given attack.

This invention separately provides systems, methods and devices that maintain the semantics of a given attack as it is modified.

This invention separately provides systems, methods and devices for determining whether a set of network traffic is a modified version of a given attack.

This invention separately provides systems, methods and devices for defining an attack.

This invention separately provides systems, methods and devices for determining attack invariants.

In various exemplary embodiments of systems, methods and devices according to this invention, a plurality of modification rules are defined. In various exemplary embodiments, these modification rules include both complexity-increasing rules and complexity-decreasing rules. In various exemplary embodiments, the complexity-decreasing rules are applied to a given attack to identify one or more base or root attacks. The complexity-increasing rules are then applied to each of the one or more base or root attacks to generate a corpus of modified attacks. In various exemplary embodiments, the modification rules are designed to preserve the semantics of the attack, such that any modified attack generated from the given attack remains an operative attack that will allow an intruder unauthorized access to the network if not detected and stopped.

In various exemplary embodiments of systems, methods and devices according to this invention, the corpus of modified attacks generated by applying the modification rules according to this invention is used, one modified attack at a time, to determine whether the intrusion detection system being tested detects the modified attack. By determining which modified attacks the intrusion detection system is unable to detect, the sufficiency of the set of signatures provided to the signature recognition-based intrusion detection system can be determined. Likewise, the set of signatures can be augmented to allow the intrusion detection system to detect the modified attacks that it was initially unable to detect.

In various exemplary embodiments of systems, methods and devices according to this invention, the modification rules can be applied to an arbitrary portion or set of network traffic to determine if that set of network traffic is equivalent to a known attack. Accordingly, in various exemplary embodiments, it is possible to determine whether a suspected attack, i.e., a suspicious set of network traffic, is not a real attack, or is merely a modification of a known attack.

In various exemplary embodiments of systems, methods and devices according to this invention, attack invariants, i.e., features that are common to a number of modified attack instances, are determined. In various exemplary embodiments, these attack invariants can be used to define an attack.

That is, a set of network traffic or the like is an instance of an attack A if that set of network traffic or the like can be derived from another, previously-known instance of the attack A. Similarly, that set of network traffic or the like is not an instance of the attack A if that set of network traffic or the like cannot be derived from any instance of the attack A.

These and other features and advantages of various exemplary embodiments of systems and methods according to this invention are described in, or are apparent from, the following detailed description of various exemplary embodiments of systems, methods and devices according to this invention.

BRIEF DESCRIPTION OF DRAWINGS

Various exemplary embodiments of systems, methods and devices of this invention will be described in detail, with reference to the following figures, wherein:

FIG. 3 is a chart outlining one exemplary embodiment of a set of modification rules according to this invention;

DETAILED DESCRIPTION OF EXEMPLARY EMBODIMENTS

Figure 1:
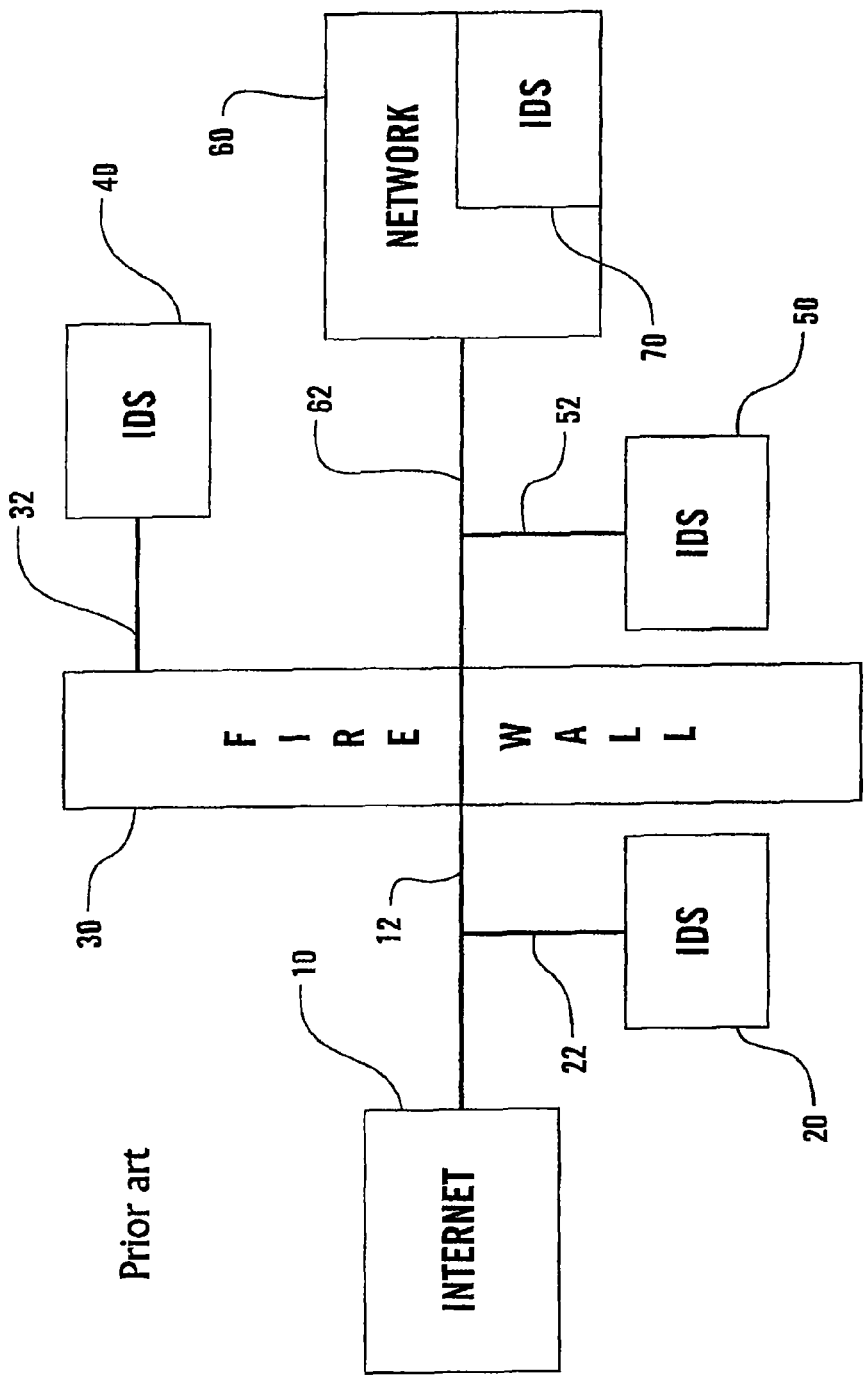
FIG. 1 is a block diagram illustrating a network, a firewall and various possible intrusion detection system locations.

There are generally two different classes of intrusion detection systems: anomaly detection systems and signature recognition systems. Anomaly detection systems attempt to detect unauthorized intrusions based on identifying statistical anomalies that occur in a monitored stream of network traffic. In contrast, signature recognition-based intrusion systems operate by examining the traffic traveling past a monitored point on the network.

In anomaly-based intrusion detection systems, a baseline of various statistics, such as CPU utilization, disk activity, user logins, file activity and/or the like, are measured to create baselines for such statistics. Then, the intrusion detection system identifies potential intrusions when there is a deviation from these baseline statistics. One advantage of anomaly detection-based intrusion detection systems is that the intrusion detection system can detect anomalies in the monitored stream of network traffic without having to understand the underlying cause behind the anomalous network activity. Furthermore, such anomaly detection-based intrusion detection systems have the potential to identify unknown attacks, that is, attacks that are not known in advance to the people that design or deploy such an anomaly-detection-based intrusion detection system. However, intrusions can escape detection if they do not create an anomalous set of statistics in the monitored network traffic.

In signature recognition-based intrusion detection systems, such monitored network points can be at external connections to the outside world or can be locations within the network itself. These signature recognition-based intrusion detection systems examine the monitored stream of network traffic for patterns that match defined attack signatures. Thus, for every different attack, at least one signature for that attack must be created for the intrusion detection system. One advantage of such signature recognition-based intrusion detection systems is that the attack does not need to create an anomalous pattern of activity in a monitored statistic. However, as indicated above, if the attack does not match any of the signatures provided to the signature recognition-based intrusion detection system, the attack will not be recognized and will be allowed to proceed.

As indicated above, to get a given attack past an intrusion detection system, intruders generally attempt to hide the attack from the intrusion detection system. For anomaly-based intrusion detection systems, hiding the attack generally means designing the attack so that it does not generate anomalous activity in any of the monitored statistics. For signature recognition-based intrusion detection systems, hiding the attack generally means modifying the attack in some way such that the attack still works but is no longer recognized by the signature recognition-based intrusion detection system. This generally means that the attack no longer matches any of the signatures provided to the signature recognition-based intrusion detection system.

As discussed above, a number of simple techniques can be used to modify an attack so that the modified attack does not match the signature of the unmodified original attack. However, because the designers of such signature recognition-based intrusion detection systems are also aware of these techniques, the designers attempt to modify one or more of the current signatures to "cover" or detect more attack instances and/or to create additional signatures designed to match, and thus catch, such modified attacks.

FIG. 1 shows one exemplary embodiment of a network environment in which intrusion detection systems are usable. As shown in FIG. 1, a network 60 can be connected to an external element, such as the Internet 10. As shown in FIG. 1, all traffic between the network 60 and the Internet 10 must pass through a firewall 30. In particular, a first connection structure 12 is used to connect the Internet 10 to the firewall 30. Any traffic that the firewall 30 allows to pass from the Internet 10 travels through the firewall 30 to the network 60 over a connection structure 62. Likewise, any traffic from the network 60 received by the firewall 30 over the connection structure 62 is passed on to the Internet 10 over the connection structure 12.

It should be appreciated that the connection structures 12 and 62 can each be any known type of connection structure, such as an Ethernet connection, a token-ring connection, a dial-up connection, a high-speed connection, a T-1 line connection or a software connection or any other known or later-developed connection structure. It should be appreciated that the firewall 30 can be a software element, a hardware element, or a combination of software and hardware elements.

It should also be appreciated that the external element connected to the network 60 through the firewall 30 does not need to be the Internet 10. Rather, the element 10 could be, in place of or in addition to the Internet 10, a bulletin board system, a private network, a private service, or the like, or any other appropriate known or later-developed external element that can be connected to directly using the connection structure 12.

As shown in FIG. 1, various intrusion detection systems 20, 40, 50 and 70 can be located between the Internet 10 and the network 60 or within the network 60. In particular, a first intrusion detection system 20 can be connected by a further connection structure 22 to the connection structure 12 at a point located between the Internet 10 and the firewall 12. Placing the intrusion detection system 20 here allows the intrusion detection system 20 to detect attacks that are attempted against the firewall 30 as well as attacks that are attempted against the network 60.

Alternatively, a second intrusion detection system 50 can be connected to the connection structure 62 between the firewall 30 and the network 60 by a connection structure 52. Placing the intrusion detection system 50 here allows the intrusion detection system 50 to detect attacks that successfully penetrate the firewall 30. This is a popular location for placing an intrusion detection system.

A third intrusion detection system 40 can be connected directly to the firewall 30 by a connection structure 32. However, firewalls usually do not produce enough information to allow the third intrusion detection system 40 to effectively detect intrusions. Thus, intrusion detection systems are rarely connected via the firewall 30 itself. Finally, a fourth intrusion detection system 70 can be placed within the network 60. It should be appreciated that, in general, a plurality of such intrusion detection systems 70 will typically be located throughout the network 60, especially when the network 60 is a large network, such as that implemented within a corporation or the like. By placing one or more of the intrusion detection system 70 within the network 60, intra-system attacks, such as, for example, unauthorized access attempts, by insiders will be detected.

An intrusion detection system, such as a network intrusion detection system, alerts a system administrator or other designated user each time an intruder tries to obtain unauthorized access to a protected network. Such unauthorized access can be an attempt by an attacker to use the Internet 10 to penetrate the network 60. As discussed above, a signature recognition-based intrusion detection system defines unauthorized access, such as penetration, using signatures. That is, if a set of network traffic past a point monitored by the intrusion detection system matches a signature provided to that intrusion detection system, an alarm is raised. Such signature recognition-based intrusion detection systems are widely deployed because they are simple to use and provide concrete information about the events that have occurred. However, signature recognition-based intrusion detection systems can be eluded or avoided if an attack does not exactly match any of the attack signatures provided to that intrusion detection system.

An attacker wishing to obtain unauthorized access to or within a network that is monitored by a signature recognition-based intrusion detection system can exploit this limitation by using a novel attack for which no signatures have been provided to the signature recognition-based intrusion detection system. Alternatively, an attacker wishing to gain unauthorized access to the network monitored by the signature recognition-based intrusion detection system can use a modified form of a known attack. That is, the attacker can use an attack for which the signature recognition-based intrusion detection system is provided with at least one signature corresponding to that known attack. However, in this case, the attacker modifies the attack to create an instance of that attack that the intrusion detection system does not detect.

In various exemplary embodiments, each of the various intrusion detection systems 20, 40, 50 and 70 can be network intrusion detection systems and/or signature recognition-based intrusion detection systems. Regardless of the type of intrusion detection system and the way in which the intrusion detection system identifies or detects intrusions against and/or within the network 60, the intrusion detection systems 20, 40, 50 and 70 will only be useful to the extent that they are able to detect not only obvious intrusions, but are also able to detect intrusions that the intruder has attempted to hide, obfuscate, or otherwise alter sufficiently that the intrusion detection system 20, 40, 50 or 70 having only a conventional set of attack signatures is unable to detect that attack. To ensure that the intrusion detection systems 20, 40, 50 and 70 are able to detect any arbitrary modified attack, regardless of where they are located between the Internet 10 and the network 60, or located within the network 60, various exemplary embodiments of systems, methods and/or devices according to this invention can be used to generate modified attacks or the like and test the particular intrusion detection system to ensure that it can adequately protect the network 60.

Take, for example, an attacker who would like to gain unauthorized access to the network 60 via the Internet 10, where the network 60 uses the intrusion detection system 20 to detect intrusions. If, for example, the intrusion detection system 20 does not perform TCP reassembly, an attacker can fragment a known attack into several TCP packets. As a result, no single TCP packet exactly matches the signature of this known attack until the TCP packets are reassembled downstream of the intrusion detection system 20. Since no single packet matches any of the signatures for this attack provided to the intrusion detection system 20, the intrusion detection system 20 does not detect this attack and does not raise any alarm. If an attacker can identify, in such cases, any instance of any attack that eludes the intrusion detection system 20, then that intrusion detection system 20 is unable to protect the network 60 and is thus effectively worthless should that vulnerability become widely known.

While attempts have been made to test various intrusion detection systems' abilities to detect such modified attacks, such experiments have created the modified attacks on an ad-hoc basis. That is, the experimenters created the corpus of modified attacks used in such experiments by hand by modifying a given attack in known ways using known modification techniques. This is similar to the way that attackers try to find modified attacks that elude a given intrusion detection system. Prior to the systems, methods and devices according to this invention, intrusion detection system designers had no way to systematically create modified attacks or to test an intrusion detection system using such systematically-generated modified attacks.

It should be appreciated that it is possible to modify an attack in such a way that the attack becomes ineffective. When a modified attack is ineffective, it is no longer able to penetrate the network or otherwise gain unauthorized access for the attacker, even if it is able to elude the intrusion detection system. One benefit of ad-hoc generating modified attack instances by hand is that the generated modified attack instances are likely to remain true attacks, as the person modifying the attack instances ensures that the modified attacks remain true attacks. However, while such ad-hoc generating of modified attack instances is likely to result in true attacks, it is difficult to generate a significant number of modified attacks in this way. Thus, the corpus of ad-hoc generated modified attacks is usually not sufficiently large to exhaustively test an intrusion detection system such that it is possible to state, with even reasonable certainty, that a particular intrusion detection system is going to detect any possible effective modified attack that an attacker could possibly launch against the network protected by the intrusion detection system.

An instance of an attack that is ineffective i.e., that is not really an attack, should not be detected. Moreover, such ineffective attack instances are useless when testing the ability of an intrusion detection system to appropriately detect modified attacks. Thus, prior to this invention, automatically generating modified attacks was of limited utility, because it might not generate only effective or true attacks. Additionally, there was no way to determine which of the conventionally automatically-generated attacks were effective or true attacks.

The inventors have determined that different instances, variations or modifications of a given attack can be derived from each other using simple transformations or rules. In various exemplary embodiments of systems, methods and devices according to this invention, these transformations or rules are implemented as rules of a formal transformation system, such as inference rules in a natural deduction system. In various exemplary embodiments of systems, methods and devices according to this invention, starting from an exemplary instance of a given attack, the inference rules can be applied to that exemplary instance to generate a corpus of modified attacks. In various exemplary embodiments, this corpus can encompass all possible instances that can be derived by these set of rules. In various other exemplary embodiments, this corpus does not include every possible instance that can be derived by these set of rules, but does include a sufficient number of instances that the space of all possible inferences is sufficiently covered. In this way, the reduced corpus is effectively equivalent to the corpus of all possible instances.

In various exemplary embodiments, this reduced corpus eliminates trivial instances and/or instances that represent an absurd application of the rules. For example, a fragmentation rule can be applied to the point where an attack is fragmented such that each packet contains only one byte of the attack payload. However, such an application of the fragmentation rule would result in a set of effectively unworkable instances, in that the number of instances of modified attacks that are only marginally different would be unwieldy. Thus, for example, the fragmentation rule can be limited to reducing a fragment of an attack to a certain minimum number of bytes in each packet, such that absurd attack instances are not generated.

Additionally, various exemplary embodiments of systems, methods and devices according to this invention enable the designer of the intrusion detection system, when creating the corpus of attack instances usable to test or otherwise evaluate the intrusion detection system, to partition the corpus of modified attack instances according to the transformation rules that were used to create the corpus of modified attack instances. For example, the designer can create two sets of modified attack instances, such as a first set of modified attack instances created by applying only the fragmentation rule and a second set of modified attack instances created by applying both the fragmentation rule and the permutation rule. Each of these two sets tests or exercises the intrusion detection system in a different way. Hence, such exemplary embodiments of systems, methods and devices according to this invention allow the designer to have better control over the testing process. This is described in greater detail below, where an exemplary testing process is split into phases and where a different subset of the rules is used in each phase.

Once the corpus of attack instances is generated, either as a true, complete set of all possible instances, or as a reduced corpus that contains a reasonable set of attack instances, the corpus of attack instances can be presented to the intrusion detection system. The attack instances are presented, one attack instance at a time, to determine whether the intrusion detection system is able to detect each modified attack instance. If the intrusion detection system is able to successfully detect every modified attack instance in the corpus, then the designer or user of the intrusion detection service will have increased confidence that the intrusion detection system is reliable.

In various exemplary embodiments, the reliability of the intrusion detection system can be evaluated in either of two ways. If the complete set or corpus of all possible modified attack instances is used, then the tester can be sure that the IDS does in fact detects all possible attack instances. In contrast, if only a reduced set is used, the tester cannot be sure that the IDS will necessarily detect all possible attack instances, but the tester will have a better confidence in the IDS. That is, when the reduced set is used, the tester can say that it is more likely that the IDS will be able to identify all attack instances.

As indicated above, the inventors have determined that different attack instances can be derived from each other using simple transformations. These transformations represent the attackers' knowledge of ways to exploit security holes in protocols and the like that are usable to gain unauthorized access to the network 60. In various exemplary embodiments, the attackers' knowledge is represented as a set of inference rules or transformation rules. In particular, in various exemplary embodiments, each rule represents an atomic or minimal transformation that an attacker can use to hide the attack from the signature recognition-based intrusion detection system.

In various exemplary embodiments, each transformation or inference rule includes both a complexity-increasing rule, or an "expanding rule", and a complexity-decreasing rule, or an "inverse rule" or a "reducing rule". For example, the fragmentation rule discussed above is an expanding or complexity-increasing rule when it is used to fragment a single packet containing an attack instance into a pair of packets, each containing a portion of the attack instance. In contrast, the fragmentation rule is a reducing, inverse or complexity-decreasing rule when it is applied in an inverse manner to recombine two packets, each containing a portion of an attack, into a single packet containing a combined portion of the attack.

The inventors have also determined that it is important, although not strictly necessary, that the transformation rules, when applied, generate only modified attacks that remain true attacks. That is, it is possible that a particular rule will modify a given instance of an attack in such a way that the modified attack is no longer able to gain unauthorized access for the attacker. Thus, the modified attack instance is no longer actually an attack. It should be appreciated that the intrusion detection system, while accurately identifying all potential attack instances, should also not identify network traffic that is not able to gain an intruder unauthorized access as an attack. Otherwise, innocuous or harmless traffic will generate unnecessary alerts.

Such unnecessary alerts are problematic for a variety of reasons. For example, if the intrusion detection system generates alerts for traffic that is not capable of gaining an intruder unauthorized access, i.e., it is not a real attack, the user, such as the system administrator, will lose faith in the intrusion detection system. Additionally, if innocuous or harmless traffic is identified as an attack and blocked or otherwise quarantined, the innocuous user, who should have been able to properly access the network 60, will be blocked. Such a harmless or even authorized user who is prevented from properly accessing the network 60 is likely to become frustrated. If the network 60 represents a commercial site of an organization and the blocked user is a potential customer, inappropriately treating the customer's network traffic as an attack will prevent sales, generate ill will toward the commercial entity, and otherwise interfere with the commercial activity the network 60 is designed to foster.

In various exemplary embodiments of systems, methods and devices according to this invention, the inference or transformation rules are formalized as a formal transformation system and are implemented as a formal model that is usable to automatically or systematically generate modified attack instances from a given attack, without requiring a person to generate a modified attack instance by hand. Natural deduction, rewriting systems, first order logic predicates and temporal logic are all examples of formal transformation systems that can be used according to this invention to generate and/or formalize inference or transformation rules according to this invention. For ease of understanding and simplicity of discussion, the following detailed description will focus on one of these types of formal transformation systems, natural deduction. However, it should be appreciated that any known or later developed formal transformation system can be used in place of natural deduction to generate and/or formalize the inference or transformation rules according to this invention.

In various exemplary embodiments of systems, methods and devices according to this invention, the inference or transformation rules are formalized as a natural deduction system and implemented as a formal model that is usable to generate modified attack instances from a given attack. There are a number of potential advantages associated with such a formal model.

One potential advantage is that the model can be made sound, i.e., the model generates only real attacks as the inference rules are applied to the given attack. A related potential advantage is that the model can be made deliberately or controllably unsound, such that attack instances that are not true or effective attacks can be generated. This is particularly useful when evaluating an IDS to test its ability to avoid generating false positives, i.e., to determine how good the IDS is at avoiding identifying a set of network traffic as an attack, when that set of network traffic is actually benign. Another potential advantage is that the model is exhaustive, i.e., the model, given a set of transformation or inference rules and a particular attack instance is able to generate all attack instances that are derivable from the given attack instance using the given set of inference or transformation rules.

Another potential advantage is that the model is self-explanatory, i.e., it provides a way of establishing that a given set or portion of network traffic is or is not a real attack. In various exemplary embodiments, if an event is a real attack, i.e., it is a modified instance of a known attack, there is a sequence of transformation or inference rules that allow the known attack to be converted into the modified attack, or vice versa. In contrast, if there is no such sequence of transformation rules that converts that set of network traffic into a known attack, with respect to the rules that are implemented, then that set of network traffic is not an attack. A further potential advantage is that by implementing both rules and inverse rules, the model may be insensitive to the starting point for converting a known rule into a modified rule. That is, by applying reducing, complexity-decreasing or inverse rules and expanding or complexity-increasing rules appropriately, any instance of a given attack, regardless of how it may have been previously modified, can be converted into any other derivable instance of that attack. It should be appreciated that various exemplary embodiments of the system methods and devices according to this invention can implement one or more of these advantages.

Figure 2:
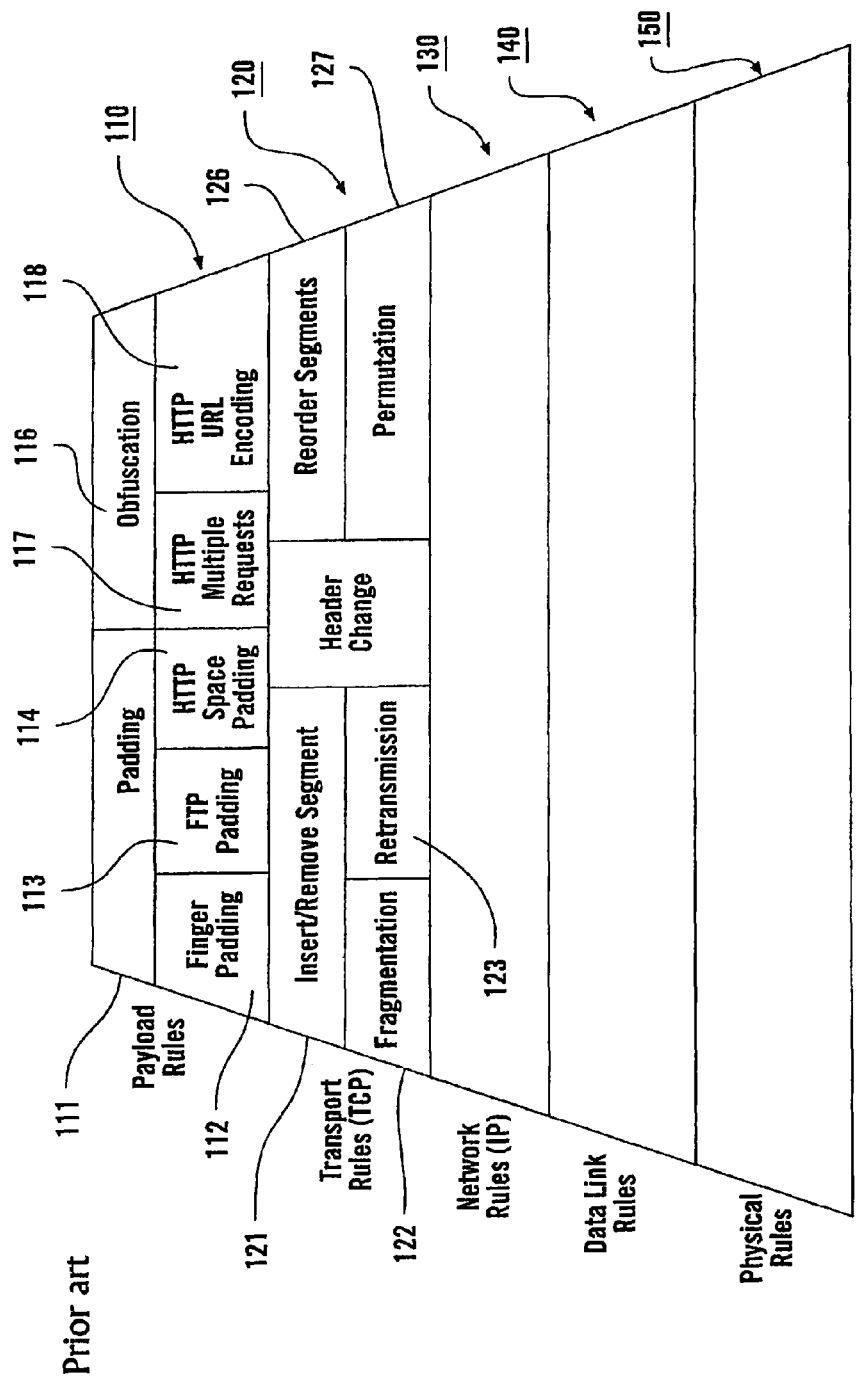
FIG. 2 illustrates the various protocol levels and modification rules associated with the various protocol levels.

As outlined above, in various exemplary embodiments, one typical external connection to the network 60 is to the Internet 10. FIG. 2 shows a representation of the various protocol levels used to implement the Internet 10 and the types of rules for modifying an attack that are appropriate to each protocol level. It should be appreciated that these rules are particularly useful with the protocols used to implement Internet connections and communications. Other rules may be appropriate for other types of external connections, such as the protocols used with dial-up connections, the protocols used with wireless connections, such as those used to implement the Bluetooth® wireless network and the like.

It should also be appreciated that the types of modifications an intruder can make to an attack are generally a function of the protocol, and more particularly, the security holes in the protocol or the application, that the attack is designed to exploit. Thus, the types of rules that need to be implemented for a particular type of external connection are typically, but not necessarily, a function of the protocols of the connection. The rules used in various exemplary embodiments of systems, methods and devices according to this invention can be developed and/or determined by analyzing protocols of a given connection or external element, such as the Internet 10, and the security holes in those protocols. Typically, once the set of rules for a particular protocol are developed, it is unlikely, although possible, that the rules will need to be modified or augmented unless the protocol itself is modified, updated or otherwise revised. However, should a new attack be detected that exploits an otherwise previously unknown security hole in a protocol, or should an otherwise previously unknown security hole in the protocol otherwise be determined or detected, the set of rules for that protocol may need to be revised, augmented or otherwise updated.

As shown in FIG. 2, with respect to intruders that attack the network 60 via the Internet 10, such attacks generally use security holes present in the Payload or Application protocol level 110 or the Transport protocol level 120. However, it is possible that an attack could exploit a security hole in the Network protocol level 130, the Datalink protocol level 140 or even the Physical level 150. In various exemplary embodiments, the Application or Payload protocol level includes, for example, such protocols as the file transfer protocol (FTP), various hypertext transfer protocols (HTTP, HTTPS and the like), and specific applications, such as Internet browsers, e-mail programs, and the like. In various exemplary embodiments, the Transfer protocol level 120 can include, for example, such protocols as the transmission control protocol (TCP) and various proprietary transport-level protocols implemented in, for example, Novell's Netware operating system, Artisofts's LANtastic network operating system, Microsoft's window server and Windows NT network operating systems, and Apple's APPLETALK network operating system.

As shown in FIG. 2, in various exemplary embodiments of the Payload protocol level 110, there are two main classes of rules, padding rules 111 and obfuscation rules 116. In various exemplary embodiments, the padding rules 111 can include, for example, finger padding rules 112, FTP padding rules 113 and HTTP space padding rules 114, among others. Similarly, the obfuscation rules 116 can include, for example, HTTP multiple request rules 117 and HTTP URL encoding rules 118

Likewise, the Transport protocol level 120 includes various classes of rules, including, for example, insert/remove segment rules 121, header change rules 125 and segment reorder rules 126. In this case, the classes of rules 121, 125 and 126 refer to the contents within a packet or datagram or the relations between the packets or datagrams in a stream of packets or datagrams being transmitted between the intruder and the network 60 via the Internet 10. As shown in FIG. 2, various exemplary embodiments of the insert/remove segment rules 121 can include, for example, fragmentation rules 122 and retransmission rules 123. Similarly, various exemplary embodiments of the segment reorder rules 126 can include, for example, permutation rules 127. These various rules 111-118 and 121-127 will be discussed in greater detail below.

FIG. 3 outlines a number of inference or transformation rules $r_1$-$r_9$ that can be used to modify an instance of a given attack. In particular, the rules $r_1$-$r_9$ can be used to modify an attack in ways that take advantage of security holes and/or features of the Payload or Application protocol level 110 and the Transport protocol level 120 of the Internet 10. As shown in FIG. 3, the first four rules $r_1$-$r_4$ are transport rules that exploit security holes and/or features of the Transport protocol level 120 of the Internet 10. In particular, the first four rules, i.e., the fragmentation rule $r_1$, the permeation rule $r_2$, the retransmission rule $r_3$ and the header change rule $r_4$, correspond to the rules 122, 127, 123 and 125, respectively, shown in FIG. 2. The last five rules $r_5$-$r_9$ are Application or Payload protocol level rules and take advantage of the security holes and/or features of the Application protocol level 110 of the Internet 10.

In particular, the fragmentation rule $r_1$ fragments or divides a single attack packet into two packets. If necessary, the fragmentation rule $r_1$ adds victim acknowledgements after each new packet. These victim acknowledgements are outbound packets generated by a victim of the attack: for example, a particular machine in the network 60. Of course, an inverse or reducing rule for the fragmentation rule $r_1$ is a defragmentation rule, $-r_1$, that combines two packets into a single packet. If the attack instance includes a victim response or acknowledgement packet between the two packets that are being combined into a single packet, that acknowledgement packet is removed or discarded from the attack instance.

The permutation rule $r_2$ permutes or reorders packets within a transport control protocol stream of the attack instance. The inverse or reducing rule for the permutation rule $r_2$ is a sorting or ordering rule, $-r_2$, that simplifies the order of the packets in the transport control protocol (TCP) stream. That is, packets in a transport control protocol stream are typically ordered such that the content within an immediately following packet is contiguous with the content of an immediately proceeding packet. The permutation rule $r_2$ changes the order of the packets such that the content of a first packet to be received is actually subsequent to the content of a subsequently received packet. It should be appreciated that, to be a sound rule, the permutation rule $r_2$ should preserve the original order between an attack packet and a victim response packet that is sent in response to that attack packet. That is, if a particular packet, or a content portion of that particular packet, requires that a victim acknowledgement or response be generated in response to that packet, the permutation rule $r_2$ should not put the victim response packet ahead of the attack packet designed to generate that victim response. When applying the permutation rule $r_2$, any modified rule generator, program, application, module, subroutine, engine or the like should keep such attack and victim response packets in the same relative order.

The retransmission rule $r_3$ adds a retransmitted attack packet to the original transport control protocol stream for a given attack instance. In general, the retransmission rule $r_3$ is a family of rules, in that different rules may cause different types of packets to be retransmitted. A retransmitted packet contains data that was contained in a previously-sent packet. An expanding retransmission rule, $r_3$, adds retransmitted packets to the transport control protocol stream. In contrast, an inverse or reducing retransmission rule, $-r_3$ removes such retransmitted packets from the transport control protocol stream. In general, the retransmitted packets to be removed are those that have changed data that is designed to exploit a security hole.

For example, each unit of data, such as, for example, a byte of data, has a unique sequence number. For example, the first unit of data may have the unique sequence number 0, the second unit of data may have the unique sequence number 1, and so on. Accordingly, a packet that transmits data having sequence numbers that were previously sent in earlier packets is a "retransmitted" packet. The TCP enables retransmitted packets to retransmit data that is different from the data that was originally sent.

For example, a first series of packets can be used to transmit the data "AGENT" with sequence numbers starting at 0. Then, part of the message can be re-sent using retransmitted packets. However, in these retransmitted packets, rather than resending packets containing the original data "ENT" and the sequence numbers 2-4, a malicious user can send packets containing the data "REE" using the sequence numbers 2-4. That is, that malicious user effectively overwrites the data "ENT" with the data "REE". The final message is thus changed from "AGENT" to "AGREE". While this example is trivial, a malicious user can use this technique to change a benign command that originally passed by the IDS without raising an alert into a malicious command. However, since the IDS does not see the whole revised command, but only those packets that change the benign command into the malicious command, it is possible that the IDS will not recognize these retransmitted packets as constituting an attack.

Similarly, a malicious user can change one or more flags within a packet when that malicious user retransmits that packet. For example, a particular retransmission rule $r_3$ may retransmit evasive Reset TCP (RST) flag packets. In a legal TCP packet, if the RST flag is set, the machine receiving the packet immediately terminates the TCP connection. An evasive RST packet is a packet that is retransmitted with the RST flag set. Since the RST flag has unique semantics, it is possible that the IDS will not handle these semantics correctly when the retransmitted packet has the RST flag set when the RST flag in the original packet was not set.

The header change rule $r_4$, like the retransmission rule $r_3$, is actually a family of rules. Thus, each header change rule $r_4$ is designed to make a different type of change to the header of the packet. An inverse or reducing header change rule, $-r_4$, is a rule that changes the header of a packet to remove data that is designed to take advantage of a security hole.

The Application Protocol level rules are applied to the contents of the various packets. With respect to the application level rules, the FTP padding rule $r_6$ adds benign file transport protocol (FTP) commands within a string of FTP commands before a malicious command. For example, in various exemplary embodiments, the command "CWD/tmp\n" and "LIST" can be added as innocuous commands before a malicious command. However, the commanded "QUIT" command cannot be added, as this command ends the FTP session. If this command were added to a string of FTP commands prior to a malicious command, the attack would become harmless, because the FTP session would be halted before the malicious command could be executed. Thus, adding the "QUIT" command is not sound, because the resulting command string does not maintain the semantics or effectiveness of the attack. Of course the inverse or reducing FTP padding rule, which can be thought of as a FTP thinning rule, $-r_6$, removes benign FTP commands that do not accomplish any necessary function in the string of received FTP commands.

Similarly, the HTTP space padding rule $r_7$ inserts spaces after an HTTP method. For example, the HTTP space padding rule $r_7$ changes an HTTP request from "get <URL>" into "get  <URL>". Of course, the inverse or reducing rule, which can be thought of as an HTTP thinning rule, $-r_7$, removes any extraneous or unnecessary or otherwise non-functional spaces within an HTTP method or request. As such, the inverse or reducing rule $-r_7$ would remove the spaces between the command and the website URL in the examples outlined above, rather than adding them.

The HTTP multiple request rule $r_8$, like the FTP padding rule $r_6$, adds benign HTTP requests before a malicious request. Such benign requests include requests like "get <www.cnn.com>". Like the FTP padding rule $r_6$, the benign requests should not contain requests like "connection: close" because such commands change the attack semantics. For example, in HTTP version 1.1, putting the request "connection: close" before the malicious request will result in the connection closing before the malicious request is executed. As a result, the attack will become ineffective or useless. In various exemplary embodiments, for the rules to remain sound, such benign requests should be omitted. The inverse or reducing rule for the HTTP multiple request rule $r_8$, like the inverse or reducing rule for the FTP padding rule $r_6$, which can be thought of as an HTTP minimal request rule, $-r_8$, removes such benign and unnecessary requests from the received content. As a result, after applying the inverse or reducing rule a number of times, only those requests are left in the received content that are necessary for the attack to work and gain access for the intruder.

The HTTP URL encode rule $r_9$ replaces the printable characters in a uniform resource locator (URL) string with the corresponding equivalent ASCII values. The inverse or reducing rule, which can be thought of as an HTTP URL decode rule, $-r_9$, replaces ASCII values in a uniform resource locator (URL) string with the corresponding printable characters.

It should be appreciated that the rules outlined above and shown in FIG. 3 represent only a small subset of the possible rules that can be developed to modify a known attack that matches a signature within a signature recognition-based intrusion detection system into a modified attack that does not match any of the signatures provided to the signature recognition-based intrusion detection system, yet maintains its malicious effect.

Figure 5:
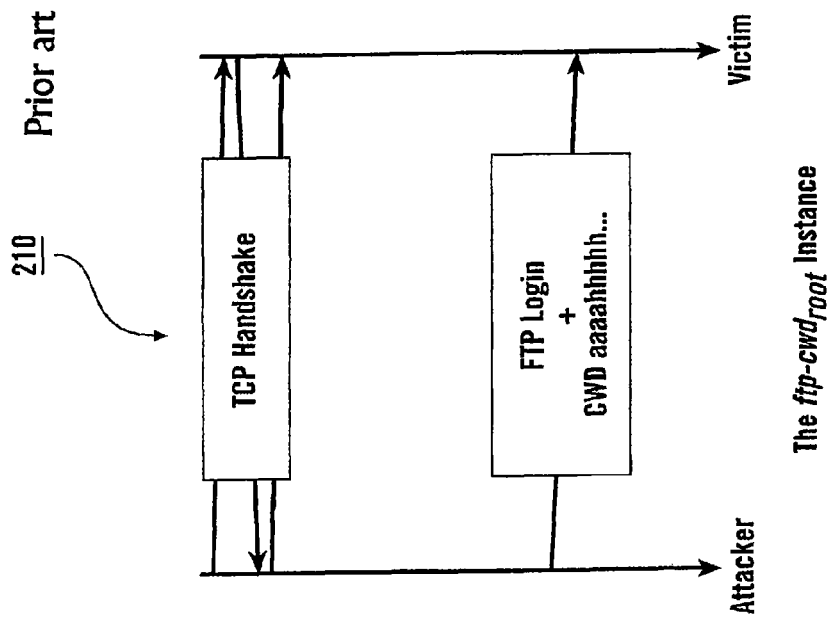
FIG. 5 illustrates one exemplary packet sequence of the root or base version of the attack shown in FIG. 4 after various complexity reducing rules were applied to the attack.
Figure 4:
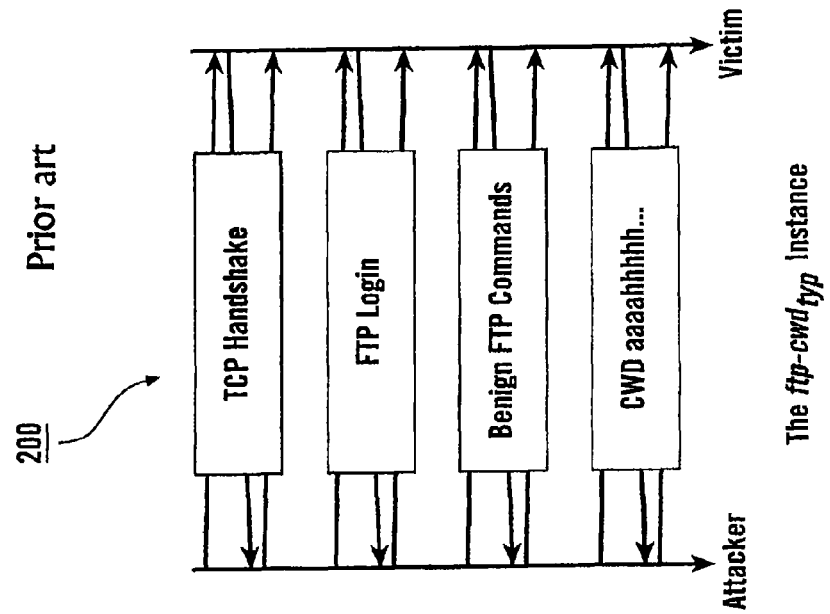
FIG. 4 illustrates a packet sequence for one exemplary instance of an exemplary attack.

FIGS. 4 and 5 show a typical instance of a well-known attack 200 and how the rules, and especially the inverse rules, can be used to modify that attack. In particular, FIGS. 4 and 5 illustrate two attack instances 200 and 210 of a known file transfer protocol (FTP) vulnerability. As shown in FIGS. 4 and 5, these two attack instances 200 and 210 can be derived from each other by appropriately applying a number of inverse rules (or one or more inverse rules a number of times) to the attack instance 200 shown in FIG. 4 or applying a number of the expanding or complexity-increasing rules to the attack instance 210 shown in FIG. 5.

In particular, FIGS. 4 and 5 illustrate two instances of an FTP attack that exploits a buffer overflow in a commonly-used ftp server. By exploiting this buffer overflow vulnerability, an attack may crash the server or may present the intruder with root privileges. The attack exploits the buffer overflow vulnerability by presenting the ftp server with an overly-long argument for the ftp change directory command (CWD). This attack is identified as the "ftp-cwd attack" herein.

In particular, FIG. 4 shows a typical instance 200 of the ftp-cwd attack, i.e. a "ftp-cwd$_{typ}$" attack and is similar to many attack instances that can be found on many hacker sites. This typical attack contains four phases, each containing several TCP packets. These phases are, in order, a TCP handshake phase, a ftp login phase, a benign phase in which the attacker browses the server using benign ftp commands, and an attack phase in which the attacker launches the attack by sending a long change-directory (CWD) command. In particular, the ftp login phase is typically achieved by anonymous login. However, it should be appreciated that the benign phase is not actually necessary for the effectiveness of the ftp-cwd$_{typ}$ attack. That is, the ftp benign phase commands are used to hide or obfuscate the presence of the attack by lulling the intrusion detection system into treating the ftp session as a benign one. That is, if an intrusion detection system does not continue to monitor the ftp session past the first few benign commands, that intrusion detection system will not catch the malicious change directory command.

FIG. 5 shows the most basic or root version of the ftp-cwd attack 210 after all of the unnecessary FTP commands, with respect to the attack, have been removed from the attack ftp session and the login and attack phase packets have been combined into a single packet. This much shorter instance 210 of the ftp-cwd attack is referred to herein as the "ftp-cwd$_{root}$" attack because, with respect to the transformations or rules according to this invention, no further complexity-decreasing, inverse or reducing rules can be applied to the ftp-cwd$_{root}$ instance without eliminating something from the ftp session that is necessary for the ftp-cwd attack to be successful. In particular, the ftp-cwd$_{root}$ attack instance 210 contains only the necessary data for a successful ftp-cwd attack.

As indicated above, this necessary data is condensed into a single TCP packet, except for the TCP-handshake packets. Putting the ftp messages required for a successful ftp-cwd attack, i.e., the login messages, such as, for example, the USER message and the PASS message, and the CWD message into a single packet is possible because, to carry out the attack, no server (victim) response packets need to be sent by the server being attacked. Additionally, the file transfer protocol (FTP) is an application-level protocol that is, and should be, indifferent to the number of TCP packets used to deliver its messages. Thus, while the ftp-cwd$_{typ}$ and the ftp-cwd$_{root}$ attack instances might look different from one another, from the intruder's point of view, they are the same attack. That is, from the point of view of the intruder, if the intruder can exploit the victim using the ftp-cwd$_{typ}$ attack instance, then that intruder can also exploit the victim using the ftp-cwd$_{root}$ attack instance. Intuitively speaking, the ftp-cwd$_{typ}$ attack instance can be inferred from the ftp-cwd$_{root}$ attack instance, and vice versa.

In the following discussion, $s_i$ represents any arbitrary TCP sequence. Furthermore, $a_i$ denotes a TCP sequence that implements an attack A. That is, $a_i$ is an instance of the attack A. With these definitions, formal definitions for the two rules that will allow the attack instance ftp-cwd$_{root}$ to be transformed into the ftp-cwd$_{typ}$ attack instance can be defined. First, for the TCP-fragmentation rule $r_1$, if $a_1$ is an instance of an attack A and $a_2$ is obtained from $a_1$ by copying the packets of $a_1$ and then fragmenting a single packet of $a_2$ into two packets, then $a_2$ is also an instance of the attack A.

Likewise, with respect to the ftp-padding rule $r_6$, if $a_1$ is an instance of an ftp attack A that includes at least one malicious FTP command after login and $a_2$ is obtained from $a_1$ by inserting one or more benign ftp commands between the login message and the malicious command, as long as the inserted benign ftp command is not the "QUIT" command or some other semantics-changing command, then $a_2$ is an instance of the attack A as well.

As outlined above, these rules are semantics-preserving rules because they do not alter the semantics of the initial attack instance $a_1$. In particular, according to the TCP specification, it is legal to fragment TCP packets as desired. Of course, if an FTP attack A should be developed that cannot be fragmented or padded by any arbitrary ftp commands, then the TCP fragmentation rule or the FTP padding rule $r_6$ should be changed to only allow legal (i.e., semantics-preserving) modifications.

If the attack instance ftp-cwd$_{root}$ is an instance of the ftp-cwd attack, then, by using $r_1$ and $r_6$, it is possible to derive the conclusion that ftp-cwd$_{typ}$ is also an instance of the ftp-cwd attack. In particular, the FTP padding rule $r_6$ can be applied to the ftp-cwd$_{root}$ instance to add benign commands between the FTP login portion and the CWD portion of the packet 270. Then, using the TCP fragmentation rule $r_1$, the padded packet 270 can be split into the three separate packets 220, 230 and 240 shown in FIG. 4. Alternatively, the TCP fragmentation rule $r_1$ could be applied to the packet 270 shown in FIG. 5 to fragment the single attack packet 270 into the FTP login packet 220 and a malicious CWD packet. Then, the FTP padding rule, $r_6$, can be used to add the benign FTP command, to one of these two packets and the fragmentation rule $r_1$ again applied to the padded packet to obtain the command packet 230 between the FTP login packet 220 and the malicious CWD packet 240 in the ftp-cwd$_{typ}$ attack instance shown in FIG. 4.

Using natural deduction terminology, the ftp-cwd$_{typ}$ instance is derived from the ftp-cwd$_{root}$ instance using the rules $r_1$ and $r_6$. More formally, this can be written as:

$$\text{ftp-cwd}_{root} \vdash_{(r1, r6)} \text{ftp-cwd}_{typ}.$$

It should be appreciated that, with respect with the ftp-cwd attack, the transformation rules $r_1$ and $r_6$ define a closure over a subset of the ftp-cwd attack instances. The transformation rules $r_1$ and $r_6$ can be used to derive not only the ftp-cwd$_{typ}$ attack instance, but also derive other instances of the ftp-cwd attack. That is, the transformation rules $r_1$ and $r_6$ can be used to create any possible instance of the ftp-cwd attack that contains any number of benign ftp commands and is fragmented into any number of TCP packets. This means that the derivation process can be automated, because every potential ftp-cwd attack instance of this type can be identified from the ftp-cwd$_{root}$ attack instance and the generated modified attack instances can be gathered into a corpus of modified attack instances for testing purposes.

It should also be appreciated that there is no interference between the transformation rules $r_1$ and $r_6$. That is, as outlined above, to derive the ftp-cwd$_{typ}$ attack instance from the ftp-cwd$_{root}$ instance, it is possible to fragment the attack and then add the benign ftp commands, or first add the benign ftp commands and then fragment the attack. Because the outcome of the order of applying the transformation rules is not important, this should simplify both implementing an automatic system and determining its theoretical aspects.

Finally, as outlined above, the inference process can be bi-directional. As outlined above, the ftp-cwd$_{root}$ instance is derivable from the ftp-cwd$_{typ}$ instance by applying the defragmentation rule $-_1$ and the benign-command-removal $-r_6$. As outlined above, this bi-directional property suggests that a derivation process can start from any attack instance. As a result, the process of finding attack instances that elude a signature recognition-based intrusion detection system is not overly sensitive to the starting attack instance.

All of the above outlined observations can be collected to create a general computational model usable to derive attack instances. In various exemplary embodiments, a computational model according to this invention is based on natural deduction and can be used to formally define an intrusion detection system testing problem, which is also known as the "black hat" problem, as well an attack verification problem, which is also know as the "white hat" problem.

A natural deduction system is a type of formal transformation system that operates on a set of facts F and a set of inference rules $\Phi$. Such a natural deduction system enables a new fact f to be derived by applying one or more of the inferences rules $\Phi$ to the previous set of facts F. In particular, the set of rules $\Phi$ and a fact $f_1$ derives a new fact $f_n$ if there is a derivation sequence $f_1, \ldots, f_n$ such that $f_1$ is an element of the set of facts F and every subsequent fact $f_{i+1}$ is a result of applying one of the inference rule $\Phi_i$ to $f_i$. A derivation sequence $f_1, \ldots, f_n$ terminates in $f_n$ if no inference rule $\Phi_i$ can be applied to $f_n$ to derive a subsequent new fact $f_{n+1}$.

To ensure a finite number of derivation starting points, in various exemplary embodiments, the rules in the set of inference rules $\Phi$ should meet three criteria. First, each rule should have an inverse rule. That is, for each complexity-increasing or expanding version of a rule, there is a complexity-decreasing, inverse or reducing version. Second, an inverse or reducing rule should not increase the length, for example, in bytes, of an attack instance. Third, a derivation sequence that contains only shrinking rules has no cycles. It should be appreciated that each of these criteria hold for the rules $r_1$-$r_9$ outlined above.

In this computational model, for a given set of attack instances $(a_1 \ldots a_n)$, derivation starting points or roots are defined for each attack instance $a_i$. It should be appreciated that, in various exemplary embodiments, a root or derivation starting point of an attack $a_i$ is the most compact and simple representation of that attack instance $a_i$. More formally, a root of an attack instance $a_i$ is an attack instance that terminates a derivation sequence containing only inverse or reducing rules of the set of inference rules $\Phi$ and that starts from the attack instance $a_i$. The three criteria outlined above ensure that any such sequence terminates and that the set of roots for each attack instance $a_i$ in finite. The set of roots for an attack $a_i$ is represented as $\text{root}_\Phi(a_i)$ and, for a set of instances, a $\text{root}_\Phi(a_1, \ldots, a_n)$.

Based on these definitions, it becomes possible to formally define a derivation model for an attack as well as for the black hat problem and the white hat problem. For simplicity, the following definitions are based on a single attack instance $a_i$. However, these definitions can be trivially extended to a set of attack instances. In particular, if $a_i$ is an instance of an attack A and $\Phi$ is a set of sound inference rules with respect to the attack A, then a derivation model of A is a natural deduction system:

$$(\text{root}_\Phi(a_i), \Phi).$$

Moreover, the closure of the derivation model, $$Cl_\Phi(root_\Phi(a_i)),$$

is the set of all sequences that are derivable by the derivation model of A, i.e., (roots$_\Phi$(a$_i$), $\Phi$), using the rules of $\Phi$.

It is also then possible to define the view of an arbitrary intrusion detection system N with respect to an attack A. In particular, the view of an arbitrary intrusion detection system N with respect to the attack A, $$S_N^A,$$

is the set of sequences that the intrusion detection system N recognizes as the attack A.

It is also then possible to define the black hat problem. In this case, as outlined above, an attack derivation model of an attack A is (root$_\Phi$(A$_i$), $\Phi$). An arbitrary intrusion detection system N and its view with respect to the attack A is $S_N^A$. The black hat problem is then to find a sequence S that is derivable by the derivation model (root$_\Phi$(A$_i$), $\Phi$) but is not in the view $S_N^A$. That is, the black hat problem is the problem attackers hope to find and that IDS designers try to solve: to find an attack instance that eludes the IDS.

In contrast, the white hat problem is to determine whether the sequence S is an element of the closure Cl$_\Phi$(root$_\Phi$(a$_i$)) of the attack derivation model of the attack A, i.e., (roots$_\Phi$(a$_i$), $\Phi$). That is, the white hat problem is the problem an IDS try to solve: to determine whether a given sequence S is the attack A. The ability of systems, methods and devices according to this invention to formally define the white had problem, independently from any specific IDS, enables various systems, methods and devices according to this invention to evaluate an IDS's capability to detect attacks.

It should be appreciated that, in various exemplary embodiments, the derivation model of the attack A, i.e., (root$_\Phi$(a$_i$), $\Phi$) can be sound, complete and/or decidable To be sound, the attack derivation model derives only sequences that implement the attack A. To be complete, the attack derivation model can derive any sequence that implements the attack model A. Finally, to be decidable, given an arbitrary sequence, it is possible to determine whether or not the sequence is derived from one of the roots of the attack A.

For the black hat problem, soundness means that any instance that is found to evade the network intrusion detection system N implies vulnerability in that intrusion detection system N. Likewise, for the black hat problem, completeness means that eventually the attack derivation model will generate all instances of the attack that evade the intrusion detection system N. In contrast, for the white hat problem, soundness means there are no false positives, i.e., there are no sequences S that are identified as being derivable from one of the roots of the attack A, but are not real attacks. Likewise, for the white hat problem, completeness means there are no false negatives, i.e., no sequences S that are determined not to be derivable from one of the roots of the attack A but in fact are so derivable, and hence are real attacks.

In various exemplary embodiments according to this invention, the derivation model is sound because the rules are themselves required to be sound and because their combinations are required to be sound. With respect to the inference rules r$_1$-r$_9$ outlined above, exemplary embodiments that implement only one or more of these rules generate an attack derivation model that is also decidable. However, it should be appreciated that this does not mean that all attack derivation models are decidable in general. Obfuscation techniques or rules are techniques to modify code. These techniques or rules are used to obfuscate, or hide, malicious code that is found in, for example, worms. For example, if one or more obfuscation rules were implemented in the attack derivation model, it is likely that the attack derivation model would become undecidable.

It should be appreciated that proving completeness may not be possible for any attack derivation model for a given attack A. To prove completeness, it is necessary to show that the attack derivation model generates all possible sequences S that adhere to a formal definition of a notion of a sequence S that implements the attack A. Since such a formal definition does not yet exist, based on the inventors' present knowledge, proving completeness is not possible. However, a derivation model can be used to inductively define the concept of "implementing an attack A." That is, a sequence S$_i$ implements an attack A if, and only if, that sequence S$_i$ can be derived from another sequence S$_j$ that is known to implement the attack A. In particular, this can be performed by first determining an induction base, that is, by determining a sequence S$_j$ that implements the attack A under consideration, and then by determining transformation rules that preserve the semantics of the attack A. Once the sequence S$_i$ and these rules are defined, then the attack derivation model, according to various exemplary embodiments of this invention, will define the set of all sequences S that implement the attack A.

Figure 6:
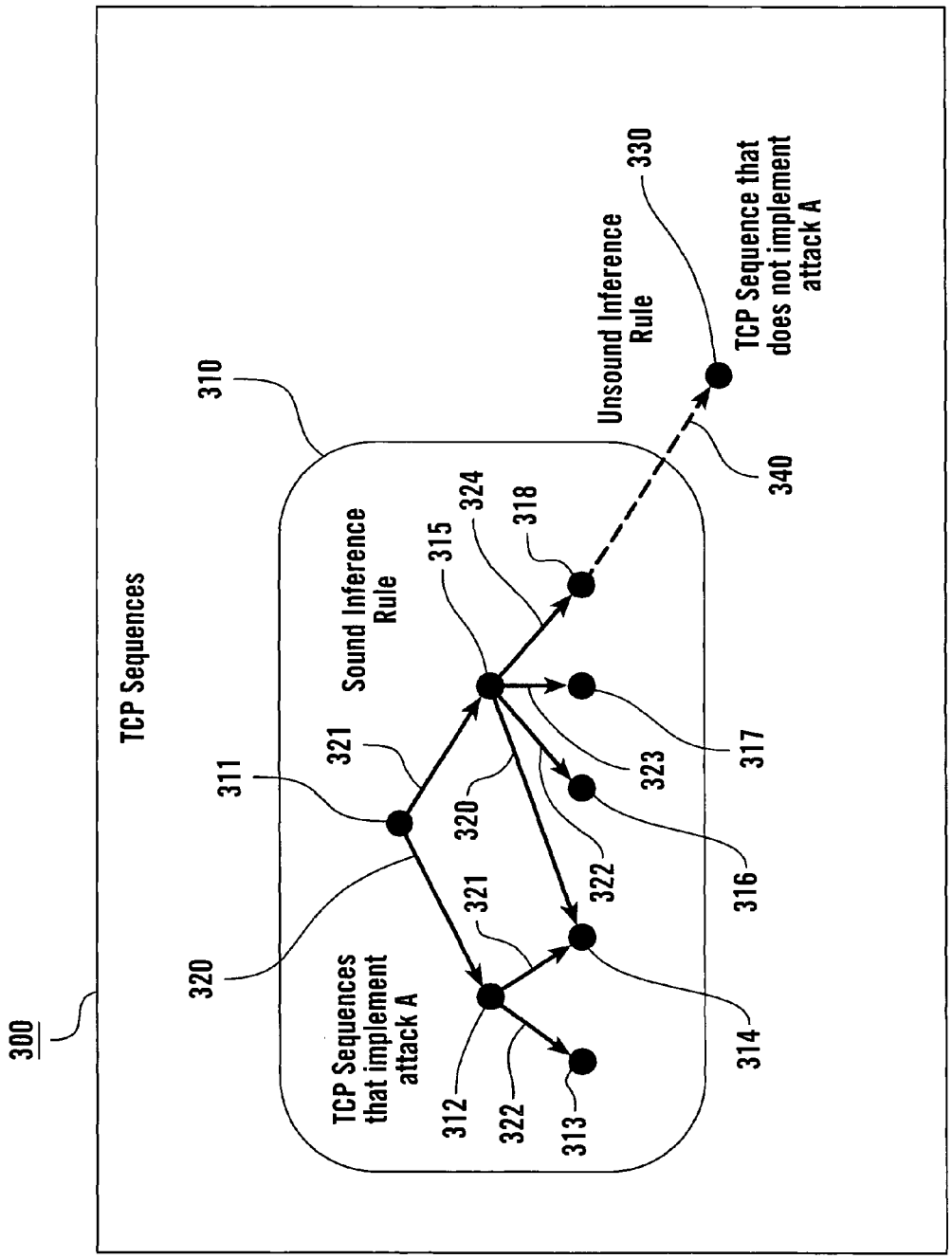
FIG. 6 illustrates the effect of applying sound and unsound inference rules when modifying an instance of an attack according to an embodiment of the applicant's invention.
Figure 7:
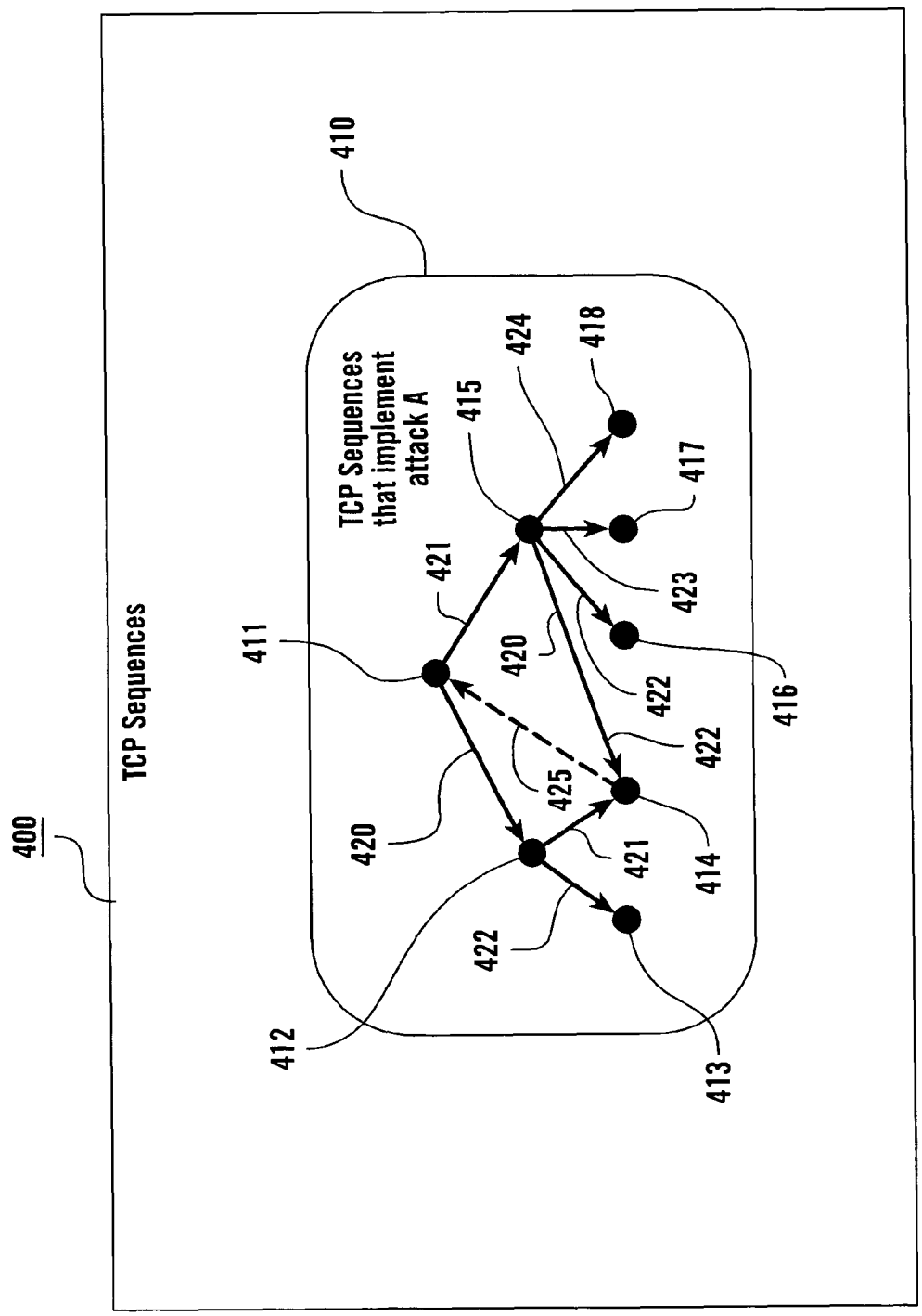
FIG. 7 illustrates the affect of applying only sound inference rules when modifying an instance of an attack according to an embodiment of the applicant's invention.

FIGS. 6 and 7 illustrate, with respect to the space of all possible transport control protocol (TCP) sequences 300 and 400, a subset of those sequences 310 and 410 that implement an attack A and the effect of applying an unsound inference rule. As shown in FIG. 6 starting with a root attack sequence 311, various sound inference rules 320-325 can be applied in various orders to generate additional attack instances A$_i$, i.e., TCP sequences 312-318 that implement the attack A. As shown in FIG. 6, a particular attack instance 312 can be derived by applying the sound inference rule 320 to the root attack 311. The sound inference rule 321 can then be applied to the attack instance 312 to derive the attack instance 314. In contrast, the sound inference 321 can be applied first to the root attack instance 311 to derive the attack instance 315. Then, the sound inference rule 320 can be applied to the attack instance 315 to derive the same attack instance 314.

Similarly, the sound inference rule 324 can be applied to the attack instance 315 to derive the sound attack instance 318. However, if an unsound inference rule 340 is applied to the sound attack instance 318, a TCP sequence 330 is generated that does not implement the attack A.

Various exemplary embodiments of systems, methods and devices according to the invention can be used in two ways. First, the IDS can be evaluated with respect to false negatives, i.e., TCP sequences that implement an attack A but that the IDS fails to detect as an attack. To do so, the tester should start from a known attack instance and use sound inference rules. Second, the IDS can be evaluated with respect to false positives, i.e., TCP sequences that do not implement the attack A but match one or more of the signature(s) that the IDS uses to determine whether a given set of network traffic or the like is an instance of the attack A. The result of a false positive is a false alarm. When a tester searches for false positives, the tester can start from a TCP sequence that implement the attack A and apply one or more unsound inference rules along with zero, one or more sound inference rules. Alternatively, the tester can start from a TCP sequence that matches the signature and apply one or more unsound inference rules along with zero, one or more sound inference rules.

In contrast, with respect to FIG. 7, because the inference rules for 420-424 are all sound, all of the attack instances for 412-418 that are generated from the root attack instance 411 all lie within the set of TCP sequences that implement the attack A. Additionally, as shown in FIG. 7, the inference rule 425 shows that cycles in the derivation are possible. It should be appreciated that techniques for avoiding cycles should be developed and/or used.

It should also be appreciated that, based on the rules $r_1$-$r_9$ outlined above, the number of instances that can be created from a particular root instance based on these rules is effectively infinite. That is, the rules are $r_1$-$r_n$ provide for adding material to a given attack instance and for dividing contents of that given attack instance into sub-portions. Because there is no limit to the amount of material that can be added and because any added material can be subsequently divided, there is no limit to the number of attack instances that can be derived from a particular root instance.

Of course, it is impractical to attempt to provide an infinite number of attack instances to an intrusion detection system to test that intrusion detection system. Thus, in various exemplary embodiments, it is desirable to determine how to generate a finite subset of attack instances that continues to have a high probability of finding most vulnerabilities of the intrusion detection system being tested. In various exemplary embodiments, an attack starvation model according to this invention uses a testing technique called equivalence partitioning to generate this finite subset of attack instances.

In the equivalence partitioning technique, the test cases are split into classes, such that each class represents cases that exercise different features of the system being tested. In various exemplary embodiments according to this invention, since each transformation rule represents an independent feature of an attack that an intrusion detection system being tested should be able to handle, each class can be defined as a different combination of such transformation or rules.

In various exemplary embodiments, with respect to the rules $r_1$-$r_9$ outlined above, three techniques, among others, can be used to implement such an equivalence partitioning strategy. First, in various exemplary embodiments of the attack derivation model according to this invention, the rules are applied in a depth-first order. In particular, in various exemplary embodiments, the application level rules $r_5$-$r_9$ are applied first. In various exemplary embodiments, these rules $r_5$-$r_9$ are applied first because they are independent of the transport level rules $r_1$-$r_4$. Subsequently, the transport level rules $r_1$-$r_4$ are applied.

Figure 8:
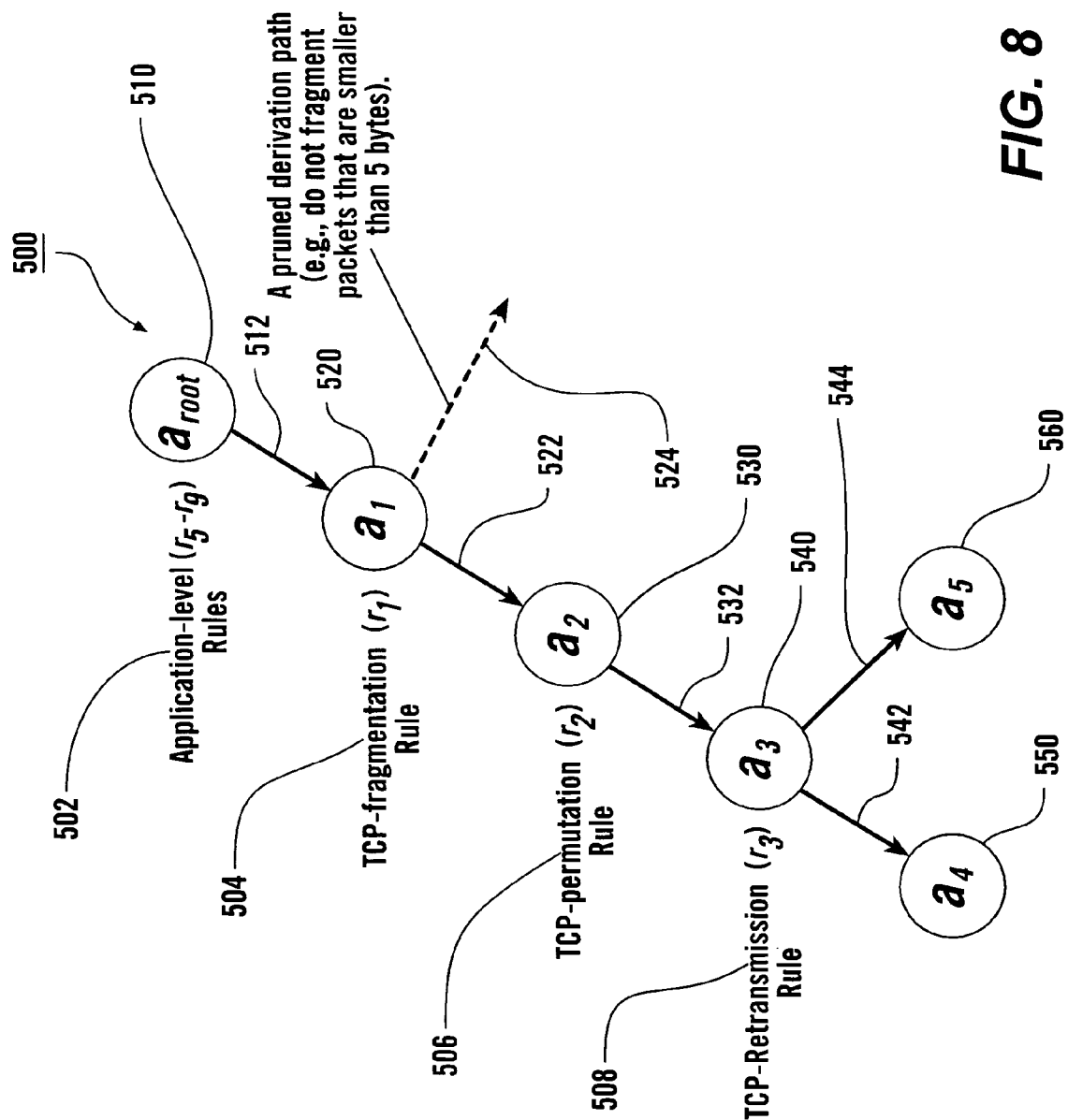
FIG. 8 illustrates a sequence of attack instances that can be generated by applying various different modification rules and rule limitations according to an embodiment of the applicant's invention.

FIG. 8 shows one exemplary embodiment of a sequence of attack instances 500 that are generated as outlined above. In particular, beginning with a root instance $A_{root}$ 510, the application level rules $r_5$-$r_9$ 502 create a first set of modified attack instances 520 over a path 512. After all of the application level rules 502 are applied, in various exemplary embodiments, the fragmentation rule 504 is then applied, followed by the permutation rule 506 and the retransmission rule 508 over the paths 522, 532, 542 and 544, respectively. In various exemplary embodiments, this order is desirable because it ensures that all instances at a given stage of the derivation path belong to different classes.

Second, it should be appreciated that, at each stage 510-540, some of the derivation paths 512, 522, 532, 542, and 544 are pruned to prevent generating a large number of instances from the same class: For example, as shown in FIG. 8, a significant number of the derivation paths 524 are pruned. In various exemplary embodiments, the attack instances that are pruned are those that only change the size of the resulting fragments and/or that only exercise the same features that were exercised by previously applied inference rules. For example, for those exemplary embodiments, packets that are five bytes or smaller are not further fragmented.

It should also be appreciated that the intrusion detection systems can be tested in phases, by applying different transformations or rules in different phases. That is, in any given phase, different ones of the transformations are applied relative to other phases. As a result, instances from different phases belong to different classes. It should be appreciated that this scheme may impair the effectiveness of applying the rules, in that that once the rules of a particular phase are applied, those rules are not subsequently reapplied in a subsequent phase. Thus, the effects of, for example, fragmenting, followed by permuting, followed by padding, followed by further fragmenting, is not analyzed. Nevertheless, phase-orientated testing is an effective way to find vulnerabilities is a tested intrusion detection system.

Figure 9:
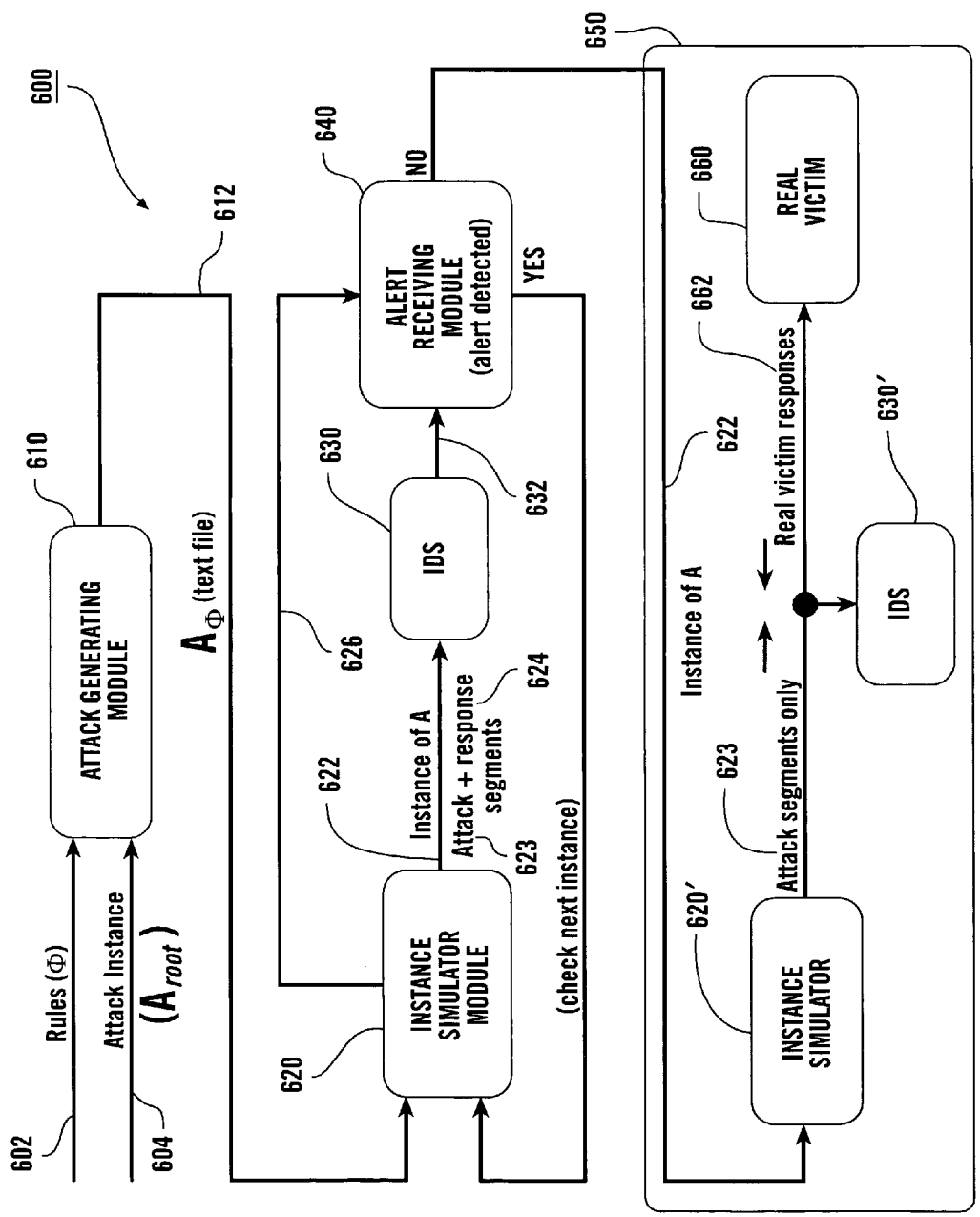
FIG. 9 is a block diagram illustrating one exemplary embodiment of a modified attack generating system according to this invention.

FIG. 9 outlines one exemplary embodiment of an attack generating and intrusion detection system testing system 600. As shown in FIG. 9, the attack generating and IDS testing system 600 is usable to test an intrusion detection system 630 and includes an attack-generating module 610, an instance simulator 620 and an alert receiving module 640.

In particular, as shown in FIG. 9, a number of rules and route or base attack instances 604 are provided to the attack generating module 610. In response, the attack-generating module 610 generates a large corpus of instances of the attack by applying the various rules for each of the one or more attack instances $A_{root}$. In various exemplary embodiments, this corpus of potential attacks could include hundreds of thousands if not millions of different attack variations. As outlined above, the rules can be applied iteratively and repeatedly to the root attack instances $A_{root}$ to generate the corpus of generated attacks $A_\Phi$.

It should be appreciated that, in various other exemplary embodiments of the attack generating and IDS testing system 600, the attack 604 provided to the attack generating module 610 can be an arbitrary attack instance $A_i$, rather than the root attack instances $A_{root}$. In this case, the attack-generating module 610 applies the reducing, inverse or complexity-reducing rules of the rules 602 to the arbitrary attack instance $A_i$ to identify one or more root attack instances $A_{root}$. These identified root attack instances $A_{root}$ are then used like the root attack instances 604 to generate the corpus of modified attacks $A_\Phi$. In general, each inverse rule is applied until applying that inverse rule would end up removing an essential part of the attack. When no more inverse rules can be applied, the root instance of the attack is identified.

As shown in FIG. 9, the corpus of generated attacks $A_\Phi$ is output over a signal line or other communications pathway 612 to the instance simulator module 620. The instance simulator module 620 selects each generated attack $A_{\Phi i}$ from the corpus of generated attacks $A_\Phi$ and presents that instances $A_{\Phi i}$ 622 to the IDS 630. In particular, as shown in FIG. 9, when the instance simulator module 620 presents the selected instance of the attack $A_{\Phi i}$ to the IDS 630, the instance simulator module 620 presents both the attack segments 623 and any network or victim response segments 624, in the sequence defined in the selected attack instance $A_{\Phi i}$. This makes the testing environment that the IDS 630 is tested in more closely simulate the environment the IDS 630 will be in when it is actively protecting a particular network.

As outlined above, when an IDS, such as the IDS 630, detects an attack, the IDS generates an alert and outputs it to a network administrator or other entity designed to receive and respond to such alerts. In the attack generating and IDS testing system 600, the alerts generated by the IDS 630 are output over a signal line 632 to an alert receiving module 640. The alert receiving module 640 determines whether the IDS 630 correctly generated an alert in response to being presented with the selected attack instance $A_{\Phi i}$. Because, as outlined above, the attack generating module 610, and more particularly the rules 602, are sound, all of the attack instances $A_\Phi$ generated by the attack generating module 610 are sound, or actual attack instances. Thus, the IDS 630 should be generating an alarm for every attack instance $A_{\Phi i}$ that is selected and presented to the IDS 630.

The alert receiving module 640 determines if the intrusion detection system 630 properly generates an alert in response to the presented attack instance $A_{\Phi i}$. In various exemplary embodiments, the alert receiving module 640 also receives over a signal path 626, an indication from the instance simulator 620 of the particular attack instance $A_{\Phi i}$ 622 that is presented to the IDS 630 for which an alert should be received over the signal line 632. The alert receiving module 640 records both the particular attack instances 622 that were presented to the IDS 630 and in the IDS 630's responses to those alerts. In this way, the sufficiency of the IDS 630 can be detected and determined, and in particular, any failures of the IDS 630 to properly generate alerts in response to the attacks can be identified and analyzed. By providing the designer of the intrusion detection system 630 with the results, the designer can determine that the IDS 630 successfully identified all possible attacks or determine the various classes of attacks and attack structures that eluded the IDS 630.

It should be appreciated that, in various exemplary embodiments, the instance simulator module 620 can be implemented using C libraries that construct TCP packets. The instance simulator module 620 plays complete TCP sessions, including TCP handshake, attacker and victim packets and determination procedures. In various exemplary embodiments, implementing the instance simulator module 620 on an 850 MHz Pentium III allowed an average of 350 instances per second to be presented to a commercial intrusion detection system used to implement the IDS 630.

It should be appreciated that, in various exemplary embodiments, after the alert receiving module 640 has been advised that a new attack instance $A_{\Phi i}$ 622 has been presented to the IDS 630, the alert receiving module 640 determines whether an alert has been received within the timeframe of the attack 622 and records that information. The alert receiving module 640 can then advise the instance simulator module 620 that a next attack $A_{\Phi i+1}$ can be presented to the IDS 630.

However, it should be appreciated that, in various other exemplary embodiments, in addition to advising the instance simulator module 620 that a next attack instance can be presented to the IDS 630, the alert receiving module 640 can also provide the current attack $A_{\Phi i}$ to an instance feasibility check module 650. In particular, in various exemplary embodiments, the attack-receiving module 640 will forward the current attack $A_{\Phi i}$ to the instance feasibility check module 650 when the IDS 630 has failed to generate an alert. This is useful to ensure that the attack instance is in fact a viable attack instance and that the IDS 630 will fail to generate an alarm in a more realistic test environment.

In particular, the instance feasibility check module 650 includes a second copy of the instance simulator module 620'. However, this instance simulator module 620', in response to receiving an attack instance $A_\Phi$ 622 from the alert receiving module 640, outputs only the attack segments 623. As shown in FIG. 9, these attack segments 623 are output over a connection structure 652 that connects the second instance simulator 620' to a real victim 660 and a second instance of the IDS 630'. In particular, the IDS 630' of the instance feasibility check module 650 is directly connected to the connection structure 652 and analyzes traffic originating both in the instance simulator module 620' and in the real victim 650.

The real victim 660, in response to receiving the attack segments 623 from the second instance simulator module 620', outputs real victim responses 662 over the connection structure 652 to the second instance simulator module 620'. If the IDS 630' fails to generate a response, and the attack instance $A_{\Phi i}$ is a true attack, in that it allows unauthorized access to the real victim 660 by the second instance simulator module 620', then there is a hole in the IDS 630. That is, the IDS 630 has failed to detect a true attack.

In various exemplary embodiments, the optional instance feasibility check module 650 was implemented using two machines connected by a local area network to separate the attack machine from the victim machine. In this exemplary embodiment, the second instance simulator 620' was identical to the first instance simulator module 620 used to initially test the IDS 630, except that it output only attack packets. The victim machine generated the victim responses by running or executing a real application that would be normally expected to receive and respond to the attack packets output by the second instance simulator 620' of the instance feasibility test module 650.

It should be appreciated that, the instance feasibility check module 650 is unnecessary, because the rules 602 are designed by definition to be sound. However, the instances feasibility check module 650 can be included to validate the analysis of the IDS 630 generated in response to the instance simulator module 620 presenting a particular attack instance $A_{\Phi i}$ to the IDS 630. The instances feasibility check module 650 can also be used to demonstrate that the IDS 630, when it fails, is not failing because the instance simulator module 620 is presenting both the attack and victim response module to the IDS 630. That is, the IDS 630 cannot be defended if it fails to detect an attack when that attack is launched by second the instance simulator 620 of the instance feasibility check module 650.

It should be understood that each of the various elements, such as the modules and simulators, of the attack generating and intrusion detection system testing system 600 can be implemented as software stored on a computer readable medium that is executable on a programmed general purpose computer, a special purpose computer, a microprocessor or the like. Such a computer readable medium includes using a carrier wave or the like to provide the software instructions to a processing device. It should also be understood that each of the various elements, such as modules and simulators, shown in FIG. 9 can be implemented as circuits, programs, applications, modules, engines, routines, subroutines, managers, procedures, objects and the like, which in turn can be implemented as portions of a suitably programmed general-purpose computer.

Alternatively, each of the various elements shown in FIG. 9 can be implemented as physically distinct hardware circuits within an ASIC, using a digital signal processor (DSP), using a FPGA, a PLD, a PLA and/or a PAL, or using discrete logic elements or discrete circuit elements. The particular form the various elements, such as modules and simulators, shown in FIG. 9 will take is a design choice and will be obvious and predictable to those skilled in the art. It should be appreciated that the various elements shown in FIG. 9 do not need to be of the same design.

It should be appreciated that a program, application, module, engine, routine, subroutine, manager, procedure, object and the like can be a self-consistent sequence of computerized steps that lead to a desired result. These steps can be defined by and/or in one or more computer instructions stored in a computer readable medium, which should be understood to encompass using a carrier wave or the like to provide the software instructions to a processing device. These steps can be performed by a computer executing the instructions that define the steps. Thus, these terms can refer to, for example, a sequence of instructions, a sequence of instructions organized within a programmed-procedure or programmed-function, and/or a sequence of instructions organized within programmed processes executing in one or more computers. Such programs, applications, modules, engines, routines, subroutines, managers, procedures, objects and the like can also be implemented directly in circuitry that performs the procedure. Furthermore, computer-controlled methods can be performed by a computer executing one or more appropriate programs, by special purpose hardware designed to perform the method, or any combination of such hardware, firmware and software elements.

Figure 10:
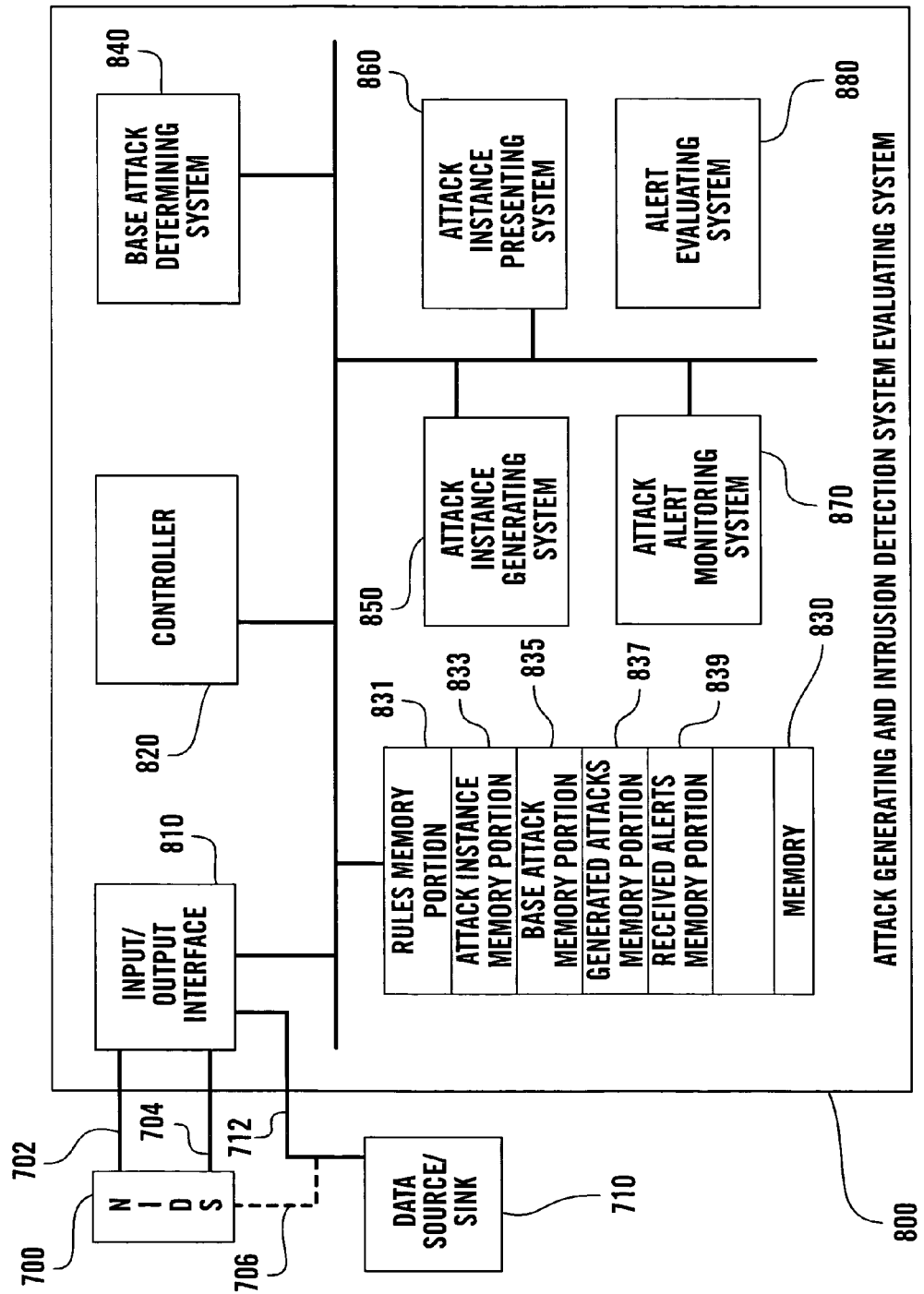
FIG. 10 is a block diagram outlining one exemplary embodiment of an intrusion detection system according to this invention.

FIG. 10 illustrates a second exemplary embodiment of an attack generating and intrusion detection system evaluating system 800 according to this invention. As shown in FIG. 10, an intrusion detection system 700 and a data source/sink 710 are connected to an input/output interface 810 of the evaluating system 800 by signal lines 702, 704 and 712, respectively. The evaluating system 800, in addition to the input/output interface 810, includes a controller 820, a memory 830, a base attack determining system 840, an attack instance generating system 850, an attack presenting system 860, an attack alert monitoring system 870 and an alert evaluating system 880. The memory 830 includes a rules memory portion 831, an attack instance memory portion 833, a base attack memory portion 835, a generated attacks memory portion 837, and a received alert memory portion 839.

The base attack determining system 840 is usable to determine one or more base or root attacks from a given attack instance based on one or more reducing, inverse or complexity-decreasing rules stored in the rules memory portion 831. The given attack is one of a number of attack instances stored in the attack instance memory portion 833. The base attack determining system 840 stores the determined base attack in the base attack memory portion 835 under control of the controller 820. Alternatively, the evaluating system 800 can receive base attacks from the data source/sink 710 via the signal line 712 and the input/output interface 810. In this case, the controller 820 of the evaluating system 800 controls the input/output interface 810 and the memory 830 to store such received base attacks in the base attack memory portion 835. It should also be appreciated that, when the evaluating system 800 receives an attack instance from the data source/sink 710, the controller 820 controls the output interface 810 and the memory 830 to store that attack instance in the attack instance memory portion 833.

In various exemplary embodiments, the base attack determining system 840 is used to determine one or more base attacks from the attack instances stored in the attack instance memory portion 833, or more and more base attack instances are stored into the attack portion 835. In various exemplary embodiments, the attack instance generating system 850, under control of the controller 820, reads each such base attacks stored in the base attack memory portion 835. The attack instance generating system 850 then applies the expanding or complexity-increasing rules stored in the rules memory portion 833 to each base attack instance read from the base attack memory portion 835 to generate a corpus of generated modified attack instances. The generated modified attack instances are then output by the attack instance generating system 850, under control of the controller 820, and stored into the generated attacks memory portion 837.

It should be appreciated that, in various exemplary embodiments, the base attack determining system 840 and the attack instance generating system 850 can be combined into a single element. In various exemplary embodiments, an attack instance that is not known to be a base attack can be stored in the attack instance memory portion 833. This attack instance can be read by the combined base determining/attack instance generating system. In this case, the combined base determining/attack instance generating system can apply both reducing, inverse or complexity-decreasing, as well as expanding or complexity-increasing, rules to generate the corpus of generated attack instances that are subsequently stored into the generated attacks memory portion 837.

The attack presenting system 860 can then be used to present attacks to the intrusion detection system 700 to be evaluated. In particular, the attack presenting system 860 selects an attack instance from the generated modified attack instances stored in the generated attacks memory portion 837 and presents the selected generated modified attacks, one at a time, to the intrusion detection system 700. In various exemplary embodiments, the attack presenting system 860, under control of the controller 820, outputs the sequence of packets of the selected generated modified attack from the generated attacks memory portion 837, through the input/output interface 810, to the intrusion detection system 700 over the signal line 702. The signal line 702 replicates a hardware and/or software connection of the intrusion detection system 700 to a connection structure extending between a network location being attacked and an external or internal network location from which the selected attack is launched to attack that network location.

Accordingly, the intrusion detection system 700 is presented with the sequence of attack packets of the selected generated modified attack over the signal line 702. As outlined above with respect to the exemplary embodiment shown in FIG. 9, in various exemplary embodiments, the generated modified attacks stored in the attacks memory portion 837 each include a sequence that includes both attack packets and appropriate victim response packets. Thus, the attack presenting system 860, in outputting the appropriate sequence of packets via the input/output interface 810 to the intrusion detection system 700 over the signal line 710, outputs both the attack packets and the victim response packets.

In response to the attack being presented to the intrusion detection system over the signal line 702, the intrusion detection system 700 outputs an alert over the signal line 704 if it appropriately detects the attack. In response, the input/output interface 810, under control of the controller 820 outputs the alert to the attack alert monitoring system 870. In response, the attack alert monitoring system 870 associates the generated alert with the current attack being presented by the attack presenting system 860 and stores that information in the received alerts memory portion 839. Additionally, if the attack presenting system 860 finishes presenting the attack to the intrusion detection system 700 without the intrusion detection system 700 generating an alert and outputting it over the signal line 704 to the input/output interface 810, the attack alert monitoring system 870 records the fact that the attack being presented by the attack presenting system 860 did not generate an alert and stores that information in the received alerts memory portion 839.

Once the attack presenting system 860 has presented all of the generated, modified attacks stored in the generated attacks memory portion 837 to the intrusion detection system 700, the alert evaluating system 880 inputs the information stored in the received alerts memory portion 839 and analyzes that information, along with the generated, modified attacks that generated those alerts, as well as those generated, modified attacks that did not generate any alerts, and determines, based on the generated, modified attacks that did not generate any alerts, the holes in the intrusion detection system 700, if there are any.

Alternatively, it should be appreciated that, in place of the alert evaluating system 880, the information stored in the received alerts memory portion 839 regarding the attacks presented to the intrusion detection system 700, and the information regarding the alerts that were received and not received in response to those attacks, can be output, under control of the controller 820, through the input/output interface 810 and over the signal line 712 to the data source/sink 710 for further evaluation. This evaluation can be performed manually or automatically.

It should also be appreciated that the intrusion detection system 700 can optionally be connected to the signal line 712 that extends between the data source/sink 710 and the input/output interface 810. This signal line 712 can act like the signal line 702 that allows the intrusion detection system 700 to monitor the traffic passing between the data source/sink 710 and the input/output interface 810. It should further be appreciated that, in various exemplary embodiments, the data source/sink 710 can be configured to generate the appropriate victim response packets in response to attack packets of a particular attack instance being output over the signal line 712 by the input/output interface 810 to the data source/sink 710.

Then, the attack presenting system 860 reads and outputs a particular generated attack from the generated attack memory portion 837 using only the attack packets. The evaluating system 800 and the data source/sink 710 can be used similarly to the instance feasibility check system 650 described above with respect to FIG. 9. In this case, the attack packets, output by the attack and presenting system 860 under control of the controller 820, and via the input/output interface 810, and the victim packets, received from the data source/sink 710, will be monitored by the intrusion detection system 700. If the intrusion detection system 700 appropriately detects these packets as an attack, the intrusion detection system 700 should output an alert over the signal line 704 to the input/output interface 810. As described above, that alert is input, under control of the controller 820, to the attack alert monitoring system 870. The attack alert monitoring system 870, as outlined above, associates or combines the alert, or lack of alert, with the generated modified attack instance being presented by the attack presenting system 860 and that combined information is stored in the received alerts memory portion 839 for later evaluation.

It should be understood that each of the input/output interface, the controller 810 and the various systems 840-880 of the attack generating and intrusion detection system evaluating system 800 can be implemented as software stored on a computer readable medium that is executable on a programmed general purpose computer, a special purpose computer, a microprocessor or the like. Such a computer readable medium includes using a carrier wave or the like to provide the software instructions to a processing device. It should also be understood that each of the various elements 810, 820 and 840-880 shown in FIG. 10 can be implemented as circuits, programs, applications, modules, engines, routines, subroutines, managers, procedures, objects and the like, which in turn can be implemented as portions of a suitably programmed general-purpose computer.

Alternatively, each of the various elements 810, 820 and 840-880 shown in FIG. 10 can be implemented as physically distinct hardware circuits within an ASIC, using a digital signal processor (DSP), using a FPGA, a PLD, a PLA and/or a PAL, or using discrete logic elements or discrete circuit elements. The particular form the various elements 810, 820 and 840-880 shown in FIG. 10 will take is a design choice and will be obvious and predictable to those skilled in the art. It should be appreciated that the various elements, such as modules and simulators, shown in FIG. 9 do not need to be of the same design.

It should be appreciated that a program, application, module, engine, routine, subroutine, manager, procedure, object and the like can be a self-consistent sequence of computerized steps that lead to a desired result. These steps can be defined by and/or in one or more computer instructions stored in a computer readable medium, which should be understood to encompass using a carrier wave or the like to provide the software instructions to a processing device. These steps can be performed by a computer executing the instructions that define the steps. Thus, these terms can refer to, for example, a sequence of instructions, a sequence of instructions organized within a programmed-procedure or programmed-function, and/or a sequence of instructions organized within programmed processes executing in one or more computers. Such programs, applications, modules, engines, routines, subroutines, managers, procedures, objects and the like can also be implemented directly in circuitry that performs the procedure. Further, computer-controlled methods can be performed by a computer executing one or more appropriate programs, by special purpose hardware designed to perform the method, or any combination of such hardware, firmware and software elements.

In various exemplary embodiments, the attack generating module 610 shown in FIG. 9 and the base attack determining system 840 and the attack instance generating system 850 outlined in FIG. 10, either as separate elements or a single element, can be implemented as an inference engine in the Prolog language. In particular, starting from a set of known facts, a Prolog program applies a set of inference rules to successively generate new facts. In the above outlined embodiments, the attack generating module 610, the base attack determining system 840 and the attack instance generating system 850, either as separate elements or a single element, use a particular attack instance as a Prolog fact and the various rules 602 and the rules stored in the rules memory portion 831, respectively, as the inference rules for the inference engine. In particular, for the attack-generating module 602 and the attack instance system 850, an exemplary embodiment of the attack that is particularly useful is the base or root attack instance.

A rule usable by a Prolog-implemented inference engine specifies a set of conditions whose conjunction must hold to derive a conclusion. For example, the rules usable with the systems, methods and devices according to this invention may specify the conditions that must hold to conclude that two TCP packets are fragments of a parent packet such that the conclusion for that rule allows those two packets to be combined into a single packet. This represents one of the complexity-simplifying rules outlined above.

Figure 11:
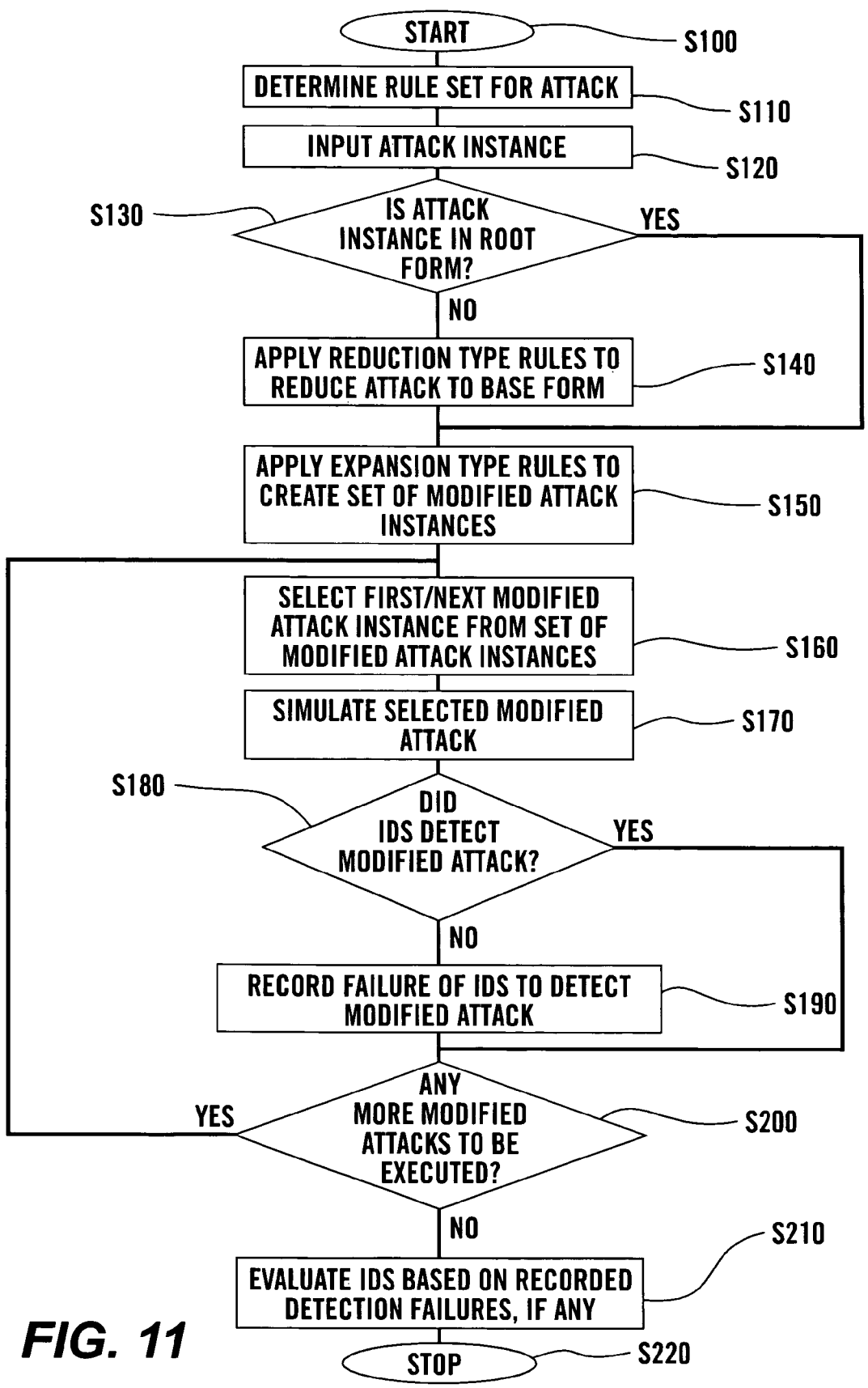
FIG. 11 is a flowchart outlining one exemplary embodiment of a method for generating attack instances according to this invention.

FIG. 11 outlines one exemplary embodiment of a method for generating attack instances, for using the generated attack instances to determine the sufficiency and effectiveness of an intrusion detection system and for modifying the signatures of a signature recognition-based IDS according to this invention. However, it should be appreciated that these functions are not necessarily interdependent. Thus, the method for generating a corpus of attacks according to this invention need not be used, or used immediately, to generate the attacks for testing an intrusion detection system. Similarly, a method for testing the intrusion detection system according to this invention need not use the method for generating attacks or use it immediately prior to evaluating the intrusion detection system. Similarly, the results obtained by performing the method for testing the intrusion detection system need not be used, or used immediately, to create new signatures for the modified attacks the intrusion detection system failed to detect.

As shown in FIG. 11, in one exemplary embodiment, beginning in step S100, control continues to step S110, where a rule set for a particular attack instance is determined. That is, depending on the particular target of the attack instance, i.e., an application, the TCP protocol, the HTTP protocol, or the like, different rules may be appropriate for modifying that attack instance. Thus, it may be desirable to use a subset of the set of rules for that attack instance. Alternatively, it should be appreciated that the set of rules need not be limited to rules that specifically deal with the target of the attack instance. In various exemplary embodiments, the set of rules is created by a security expert or the like. In various other exemplary embodiments, the set of rules can be generated automatically or interactively.

Next, in step S120, an attack instance is input. Then, in step S130, a determination is made as to whether the attack instance is in root form. If so, operation jumps directly to step S150. Otherwise, operation continues to step S140, where reducing, inverse or complexity-simplifying rules, are applied to create a set of one or more base attack instances. Operation then continues to step S150.

However, it should be appreciated that, in various exemplary embodiments, rather than determining whether the attack is in root form, step S130 can be omitted and the reducing, inverse or complexity-simplifying rules can be immediately applied in step S140 against the input attack instance to try to determine one or more root instances. Alternatively, if the input attack instance is identified as a base, or root, attack, steps S130 and S140 can be omitted.

In step S150, the expanding or complexity-increasing rules can be applied to the base attack instances to create a set of modified attack instances. Operation then continues to step S160. However, it should be appreciated that, in various exemplary embodiments, rather than continuing to step S160, operation of a method can stop at this point.

In step S160, a first or next modified attack instance is selected from the set of modified attack instances generated in step S150. Then, in step S170, the selected modified attack instance is simulated to generate the attack and response packet traffic that the intrusion detection system is designed to monitor, so that, in step S170, that packet traffic passes by a point monitored by the intrusion detection system so that the intrusion detection system can be tested to see whether it detects the modified attack instance. Operation then continues to step S180.

In step S180, a determination is made whether the intrusion detection system detected the modified attack instance executed in step S170. If so, operation jumps directly to step S200. Otherwise, operation continues to step S190, where the failure of the intrusion detection system to detect the modified attack instance is recorded. In various exemplary embodiments, the particular attack instance that the intrusion detection system failed to detect is recorded along with the indication that the intrusion detection system failed to record that attack instance. It should be appreciated, that in various exemplary embodiments, step S180 can be implemented by determining whether the intrusion detection system generated an alert in response to being presented with the traffic corresponding to the selected attack instance. Operation then continues to step S200.

In step S200, a determination is made whether there are any more modified attack instances in the set of modified attack instances to be executed. If so, operation returns to step S160, where a next one of the modified attack instances is selected from the modified attacks and steps S170-S200 are repeated. If, in step S200, there are no more modified attack instances to be executed, operation continues to step S210, where the intrusion detection system is evaluated based on the recorded detection failures, if there are any. Operation then continues to step S220, where operation of the method ends.

Figure 12:
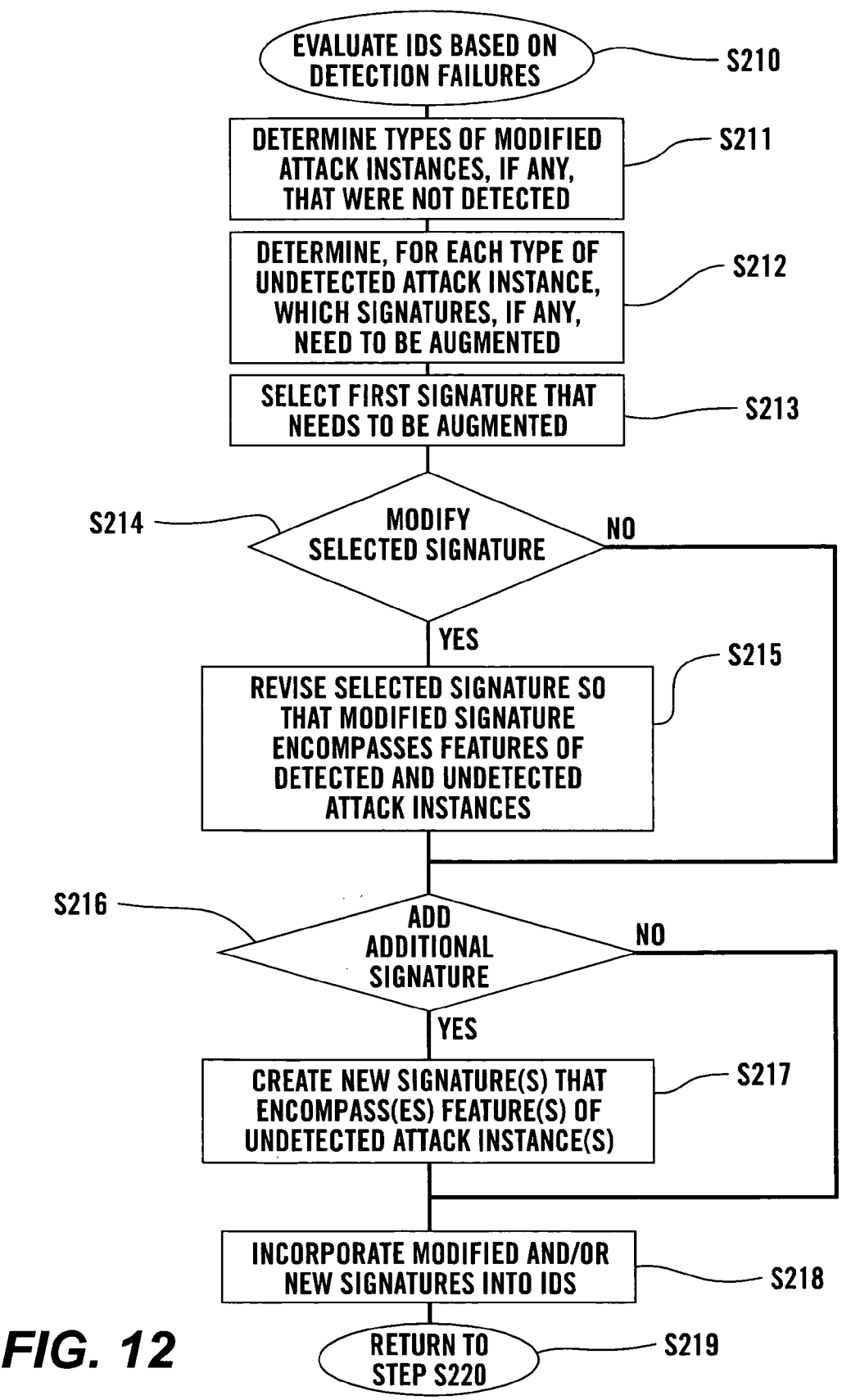
FIG. 12 is a flowchart outlining one exemplary embodiment of a method for modifying a set of attack signatures of an intrusion detection system according to this invention.

FIG. 12 outlines one exemplary embodiment of a method for evaluating an IDS based on the recorded detection failures. As shown in FIG. 12, beginning in step S210, operation continues to step S211, where a determination is made of the types of modified attack instances that were not detected, if any. Then, in step S212, a determination is made regarding, for each type of undetected attack instance, which one or more signatures need to be augmented, if any. Next, in step S213, a first or next signature that needs to be augmented is selected. Operation then continues to step S214.

In step S214, a determination is made whether the selected signature should be modified or if it is desired not to modify the selected signature. If the selected signature is not to be modified, operation jumps directly to step S216. Otherwise, if the selected signature is to be modified, operation continues to step S215. In step S215, the selected signature is revised so that the modified signature encompasses features of both the detected and undetected attack instances that the signature is directed to.

Then, in step S216, a determination is made, for the current signature that needs to be augmented, whether one or more additional signatures need to be added to the set of signatures, or if it is desired not to add any additional signatures for the selected signature. If no additional signatures are to be added, operation jumps directly to step S218. Otherwise, if one or more signatures are to be added, operation continues to step S217.

In step S217, one or more new signatures are created that encompass one or more features of the undetected attack instances corresponding to the current signature to be augmented. It should be appreciated that, in various exemplary embodiments, step S217 will be performed for any undetected attack instances which do not have one or more features such that modified signatures can be created to encompass those features of the undetected attack instances along with the corresponding features of the detected attack instances that correspond to the current signature to be augmented.

Then, in step S218, the modified and/or new signatures, if any, are incorporated into the set of signatures used by the IDS. Steps S213-218 are then repeated for each signature that needs to be augmented. Finally, in step S219, operation of the method returns to step S220.

It should be appreciated that, in various exemplary embodiments, steps S214 and 215 can be omitted, such that additional signatures are implemented to augment the signatures that need to be augmented without modifying any of the currently existing signatures. Alternatively, it should be appreciated that, in various exemplary embodiments, steps S216 and S217 can be omitted. Thus, in such exemplary embodiments, the signatures to be augmented are augmented by modifying the one or more signatures of the existing set of signatures implemented in the IDS, without adding any new signatures to that set.

It should be appreciated that, in various exemplary embodiments, the evaluation of the intrusion detection system set forth in step S210 can be omitted. In this case, the evaluation can be performed at a later time or by a separate set of individuals. However, it should be appreciated that such delayed analysis can nonetheless correspond to the intrusion detection system evaluation set forth in step S210.

In general, it is anticipated that, in step S210, and/or in response to the evaluation data generated by the systems outlined above in FIGS. 9 and 10, the results of testing the IDS will be used to modify the intrusion detection system, either by augmenting or otherwise modifying the signatures and/or by modifying the detection engine that determines whether a signature is matched.

It should also be appreciated that one or both of steps S130 and S140 can be omitted, even if the input attack instance is not known to be, or is not assumed to be, a root attack. That is, it is not necessary to apply the complexity-decreasing or inverse rules to obtain one or more root attack instances before generating the modified attack instances in step S150. However, it may be desirable to do so, so that all possible attack instances could be generated. Nevertheless, operation could continue directly from step S120 to step S150. Additionally, it should be appreciated that, if step S130 is omitted, step S140 could be combined with step S150, so that both complexity-increasing or expanding rules and complexity-decreasing or inverse rules could be applied as desired to the input attack instance to generate new attack instances, without first finding one or more root attack instances.

The attack generating and intrusion detection system evaluating system 800 shown in FIG. 10 is, in various exemplary embodiments, implemented on a programmed general purpose computer. However, the attack generating and intrusion detection system evaluating system 800 shown in FIG. 10 can also be implemented on a special purpose computer, a programmed microprocessor or microcontroller and peripheral integrated circuit elements, an ASIC or other integrated circuit, a digital signal processor, a hardwired electronic or logic circuit such as a discrete element circuit, a programmable logic device such as a PLD, PLA, FPGA or PAL, or the like. In general, any device, capable of implementing a finite state machine that is in turn capable of implementing the flowcharts shown in FIG. 11, can be used to implement the attack generating and intrusion detection system evaluating system 800 shown in FIG. 10.

Accordingly, various exemplary embodiments of systems, methods and devices according to this invention, unlike other tools for testing intrusion detection systems, when testing for false negatives, use only sound inference rules, generating instances of only real attacks. Therefore, when an intrusion detection system misses a modified attack instance generated according to this invention, the intrusion detection system is vulnerable. Furthermore, in various exemplary embodiments, systems, methods and devices according to this invention are exhaustive, capable of generating all attack instances from a given known attack instance using a set of rules. Hence, if even a single generated modified attack instance evades an intrusion detection system, systems, methods and devices according to this invention can locate that single attack instance. Likewise, various exemplary embodiments, systems, methods and devices according to this invention can be used to show that, for a finite set of all instances of an attack, an intrusion detection system correctly identifies all possible attack instances derivable by a given set of transformation rules. Additionally, in various exemplary embodiments, systems, methods and devices according to this invention can effectively find vulnerabilities in an intrusion detection system even without generating every possible attack instance.

In contrast, various exemplary embodiments of systems, methods and devices according to this invention, when testing for false positives, use at least one unsound inference rule, in place of, or in addition to, sound rules, to generate instances that are not real attacks. It should be appreciated that, once an unsound rule is used to generate an attack instance, such that the resulting attack instance is unsound, subsequent attack instances generated by further applying the rules to that unsound attack instance or its progeny tend to remain unsound, even if the subsequently-applied rules are themselves sound, unless, for example, the effect of the original unsound rule is reversed. Therefore, when an intrusion detection system identifies such a modified attack instance generated according to this invention as an attack, the intrusion detection system needs to be revised to eliminate the false positive.

Additionally, with respect to the "white hat" problem, various exemplary embodiments of systems, methods and devices according to this invention can provide proof, given a sequence of packets, that the sequence is a real attack instance. In various exemplary embodiments, this proof is a sequence of transformations that convert the sequence of packets into a known attack or a root attack generated from a known attack. Accordingly, developers of intrusion detection systems can use various exemplary embodiments of systems, methods and devices according to this invention to analyze attacks and to identify the exact transformation that the intrusion detection system failed to handle. In the various exemplary embodiments outlined above, the transformation rules discussed above take a TCP sequence that implements an attack A and returns a different sequence that also implements the attack A. The inference rules are, by definition, sound, in that they always produce a sequence that implements the attack A. Soundness insures that the systems, methods and devices according to this invention only derive instances that are real attacks.

It should be appreciated that defining sound rules is not a difficult task. However, three issues should be considered when defining rules. First, the protocol level that the attack is directed to should be appreciated. For example, FTP rules, such as, for example rule $r_2$ are not sound with respect to HTTP attacks. That is, a particular rule set is specific to a given protocol level.

Second, for a given attack A, a rule may not preserve that attack's semantics on all operating systems. That is, protocol semantics may depend upon a particular implementation of an operating system or of a program on a particular operating system. Thus, it is desirable to customize the rules set for a particular operating system. While this appears complex, in practice, it is an easy process. In particular, differences between operating systems usually only affect a small number of inference rules in the network or transport levels.

Third, interference between rules should be appreciated. A rule that preserves a given attack A's semantics when applied alone may not preserve the semantics of that attack A when applied with other rules. For example, there may be interference at the TCP level between the TCP-permutation rule and the TCP-retransmission rule. As discussed above, the TCP-permutation rule permutes the packets of the sequence, while the TCP-retransmission rule adds retransmitted packets to the sequence. Interference can occur because the retransmitted packet, by definition, must be transmitted after the original packet of which it is a retransmission. Accordingly, the original packet must be transmitted before the retransmitted packet, i.e. these two packets cannot be permuted.

As indicated above, it should be appreciated that building a set of interference rules is generally a one-time effort. A single set of interference rules can usually be used to modify many different attacks, because such attacks are directed to the same protocol level. Thus, the amortized cost of creating these set of interference rules could be fairly low. However, there are cases in which a specific rule is unsound with respect to a specific attack. For example, a HTTP-padding rule may nullify a buffer overflow attack that requires an HTTP request with a particular length. Thus, the soundness of each rule or a set of interference rules should be considered with respect to a particular attack to be modified. It should be appreciated that for a security expert determining the soundness of a rule is an easy task.

As outlined above, FIG. 3 summarizes various TCP and application-level interference rules. It should be appreciated that, in general, the rules may not be sound. For example, retransmission of new data may change the attack semantics. However, it should be appreciated that only sound versions of the rules can be used to generate real attack instances. It should also be appreciated that the rules add victims' TCP acknowledgments as part of the transformations. This is important, because, if an intrusion detection system performs a stateful TCP inspection, that intrusion detection system will use acknowledgments to update its internal TCP state. However, different orderings of attack packets and acknowledgments will typically induce different TCP states. As a result, even with a limited ability to influence the ordering between attack packets and victim acknowledgment packets, an attacker can create an ordering that induces a TCP state in which the intrusion detection system misses an attack.

As outlined above, the process for generating modified attack instances often starts from an attack instance called the root or base attack instance. As outlined above, for a particular arbitrary attack instance $A_i$, the root or base attack instance $A_{root}$ of the arbitrary attack instance $A_i$ is obtained by successfully applying the reducing, inverse or complexity-decreasing rules to the arbitrary attack instance $A_i$ until no more rules can be applied. It should be appreciated that two different instances of the same attack may produce two different root instances. Additionally, a given arbitrary instance may have multiple roots. For example, the obtained root instances may depend upon the order in which the reducing, inverse or complexity-decreasing rules are applied.

Similarly, the "white hat" problem can be analyzed by taking the set of packets in the sequence suspected to be an attack and applying the inverse, reducing or complexity-decreasing rules to that sequence until a root instance or a known attack instance is obtained. If a known attack instance or a known root is obtained, then the sequence of packets is an attack. In contrast, if the instances that are obtained by applying the reducing, inverse, or complexity-decreasing rules to the sequence of packets, are neither known roots or known instances, then the sequence of packets is either not the same attack as the known roots or is a new root.

While this invention has been described in conjunction with the exemplary embodiments outlined above, various alternatives, modifications, variations, improvements and/or substantial equivalents, whether known or that are or may be presently foreseen, may become apparent to those having at least ordinary skill in the art. Accordingly, the exemplary embodiments of the invention, as set forth above, are intended to be illustrative, not limiting. Various changes may be made without departing from the spirit or scope of the invention. Therefore, the invention is intended to embrace all known or earlier developed alternatives, modifications, variations, improvements and/or substantial equivalents.

What is claimed is:

1. A method for testing an intrusion detection system of a type monitoring a network input to detect attacks against a network that would permit unauthorized access to or use of the network, the method executed on at least one electronic computer according to a stored program, comprising:

generating from at least one known attack, a plurality of attack instances, the plurality of attack instances being generated by modifying the known attack using a plurality of transformation rules of a formal transformation system, the transformation rules changing data of the known attack while preserving the effect of the known attack as an attack on a network that would permit unauthorized access to or use of the network;

presenting to the intrusion detection system being tested at the network input of the intrusion detection system, each of a plurality of attack instances;

determining, for each presented attack instance, cases when the intrusion detection system being tested is presented with an attack instance and the intrusion detection system does not identify the attack instance as an attack in response to being presented with that attack instance; and evaluating the intrusion detection system being tested based on the determining of cases when the intrusion detection system being tested is presented with an attack instance and the intrusion detection system does not identify the attack instance as an attack, such cases indicating failure of the intrusion detection device to protect the network from attacks of a type intended to permit unauthorized access to or use of the network.

2. The method of claim 1, wherein presenting each of the plurality of attack instances corresponding to the given attack to the intrusion detection system being tested comprises:

selecting one of the plurality of attack instances, each attack instance comprising at least a sequence of at least one attack packet;

presenting the sequence of at least one attack packet of the selected attack instance to the intrusion detection system being tested; and repeating the selecting and presenting steps for each of the plurality of attack instances.

3. The method of claim 1, wherein evaluating the intrusion detection system being tested comprises:

identifying at least one attack instance for which the intrusion detection system failed to detect the attack instance as an attack;

determining, for at least one attack instance for which the intrusion detection system failed to detect the attack instance as an attack, if the intrusion detection system failed to detect that attack instance as an attack due to the intrusion detection system lacking a signature that matches that attack instance; and if so, modifying a set of attack signatures provided to the intrusion detection system such that the set of attack signatures includes at least one attach signature that is usable to detect that attack instance as an attack.

4. The method of claim 1, wherein evaluating the intrusion detection system being tested comprises:

identifying at least one attack instance for which the intrusion detection system failed to detect the attack instance as an attack;

determining, for at least one attack instance for which the intrusion detection system failed to detect the attack instance as an attack, if the intrusion detection system failed to detect that attack instance as an attack due to a structural limitation in the intrusion detection system; and if so, modifying the intrusion detection system based on that attack instance so that the intrusion detection system is able to detect that attack instance as an attack.

5. An intrusion detection system comprising:

an electronic computer communicating with an intrusion detection system to be tested, the intrusion detection system being of a type monitoring a network connection to detect attacks against a network that would permit unauthorized access to or use of the network, the electronic computer executing a stored program to:

generate from at least one known attack, a plurality of attack instances, the plurality of attack instances being generated by modifying the known attack using a plurality of transformation rules of a formal transformation system, the transformation rules changing data of the known attack while preserving the effect of the known attack as an attack on a network that would permit unauthorized access to or use of the network;

present each of the plurality of attack instances to the intrusion detection system at an input of the intrusion detection system intended to receive a network connection to a monitored network;

determine, for each presented attack instance, cases when the intrusion detection system being tested is presented with an attack instance and the intrusion detection system does not identify the attack instance as an attack;

evaluate the intrusion detection system being tested based on the determining of cases when the intrusion detection system being tested is presented with an attack instance and the intrusion detection system does not identify the attack instance as an attack, such cases indicating failure of the intrusion detection device to protect the network from attacks of a type intended to permit unauthorized access to or use of the network.

6. The intrusion detection system of claim 5 wherein the electronic computer further executes the stored program to:

for at least one given attack instance that the intrusion detection system does not identify as an attack, modify at least one attack signature presented to the intrusion detection system to form a modified attack signature, the modified attack signature usable by the intrusion detection system to detect the given attack instance.

* * * * *